(12) United States Patent
Sato et al.

(10) Patent No.: US 11,257,374 B2
(45) Date of Patent: Feb. 22, 2022

(54) INFORMATION PROCESSING APPARATUS, INFORMATION PROCESSING METHOD, AND MOVING OBJECT

(71) Applicant: SONY CORPORATION, Tokyo (JP)

(72) Inventors: Naoyuki Sato, Tokyo (JP); Kuniaki Torii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/765,362

(22) PCT Filed: Nov. 14, 2018

(86) PCT No.: PCT/JP2018/042056
§ 371 (c)(1),
(2) Date: May 19, 2020

(87) PCT Pub. No.: WO2019/107143
PCT Pub. Date: Jun. 6, 2019

(65) Prior Publication Data
US 2020/0357283 A1    Nov. 12, 2020

(30) Foreign Application Priority Data
Nov. 28, 2017   (JP) .............................. JP2017-227732

(51) Int. Cl.
*H04W 4/46* (2018.01)
*G08G 1/16* (2006.01)
*H04W 4/02* (2018.01)

(52) U.S. Cl.
CPC .............. *G08G 1/166* (2013.01); *G08G 1/163* (2013.01); *H04W 4/023* (2013.01); *H04W 4/46* (2018.02)

(58) Field of Classification Search
CPC .... G08G 1/166; G08G 1/163; G08G 1/09623; G08G 1/09626; G08G 1/096716;
(Continued)

(56) References Cited

U.S. PATENT DOCUMENTS

| 2017/0270801 A1* | 9/2017 | Kurata ............. G08G 1/096791 |
| 2017/0345311 A1* | 11/2017 | Sugiura ................... G08G 1/167 |
| 2018/0286242 A1* | 10/2018 | Talamonti ............. B60W 30/14 |

FOREIGN PATENT DOCUMENTS

| JP | 2005-39665 A | 2/2005 |
| JP | 2010-133899 A | 6/2010 |
| JP | 2013-143070 A | 7/2013 |

OTHER PUBLICATIONS

International Search Report and Written Opinion of PCT Application No. PCT/JP2018/042056, dated Jan. 8, 2019, 07 pages of ISRWO.

* cited by examiner

*Primary Examiner* — Marcus Hammonds
(74) *Attorney, Agent, or Firm* — Chip Law Group

(57) ABSTRACT

The present technology relates to an information processing apparatus, an information processing method, and a moving object that enable suitable data sharing between moving objects. An information processing apparatus includes a data selection unit that selects shared data to be shared between a first moving object and a second moving object on the basis of at least one of a distance between moving objects or a situation of the first moving object, the distance between moving objects being a distance between the first and second moving objects, and a data acquisition unit that acquires the shared data from the second moving object. For example, the present technology can be applied to a vehicle that drives automatically.

20 Claims, 13 Drawing Sheets

(58) Field of Classification Search
CPC ....... G08G 1/096791; G08G 1/096741; G08G 1/162; H04W 4/46; H04W 4/023
See application file for complete search history.

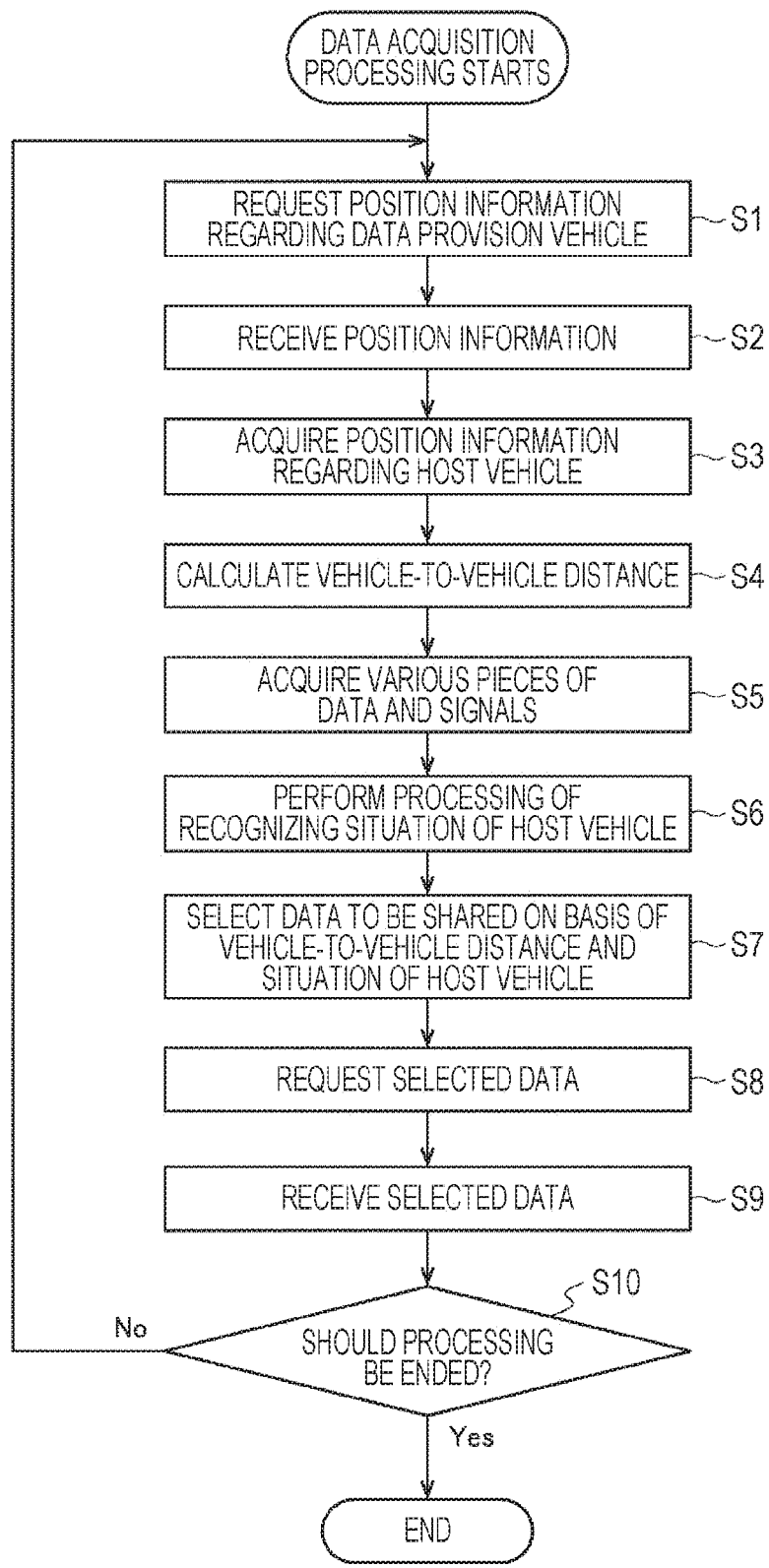

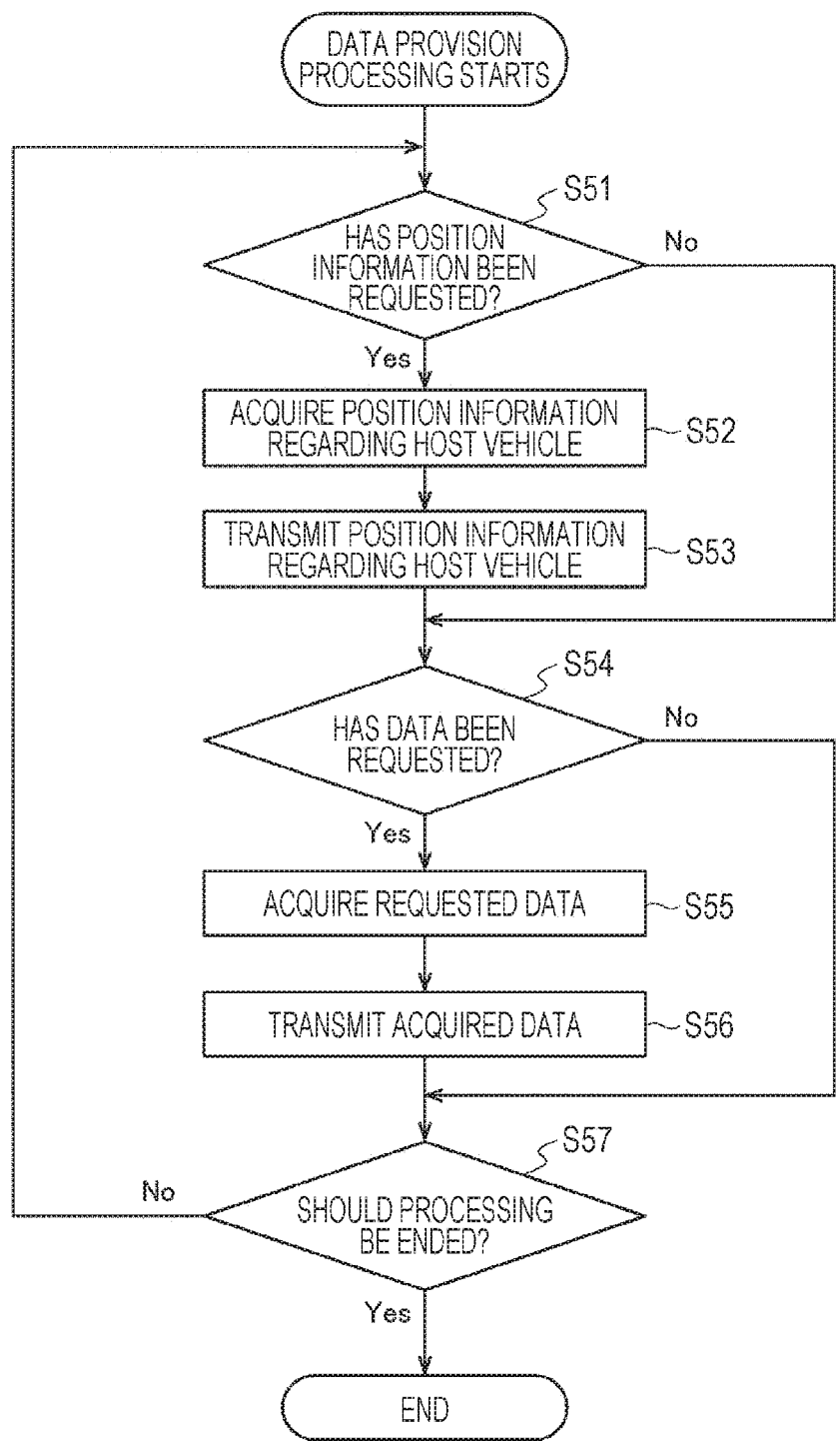

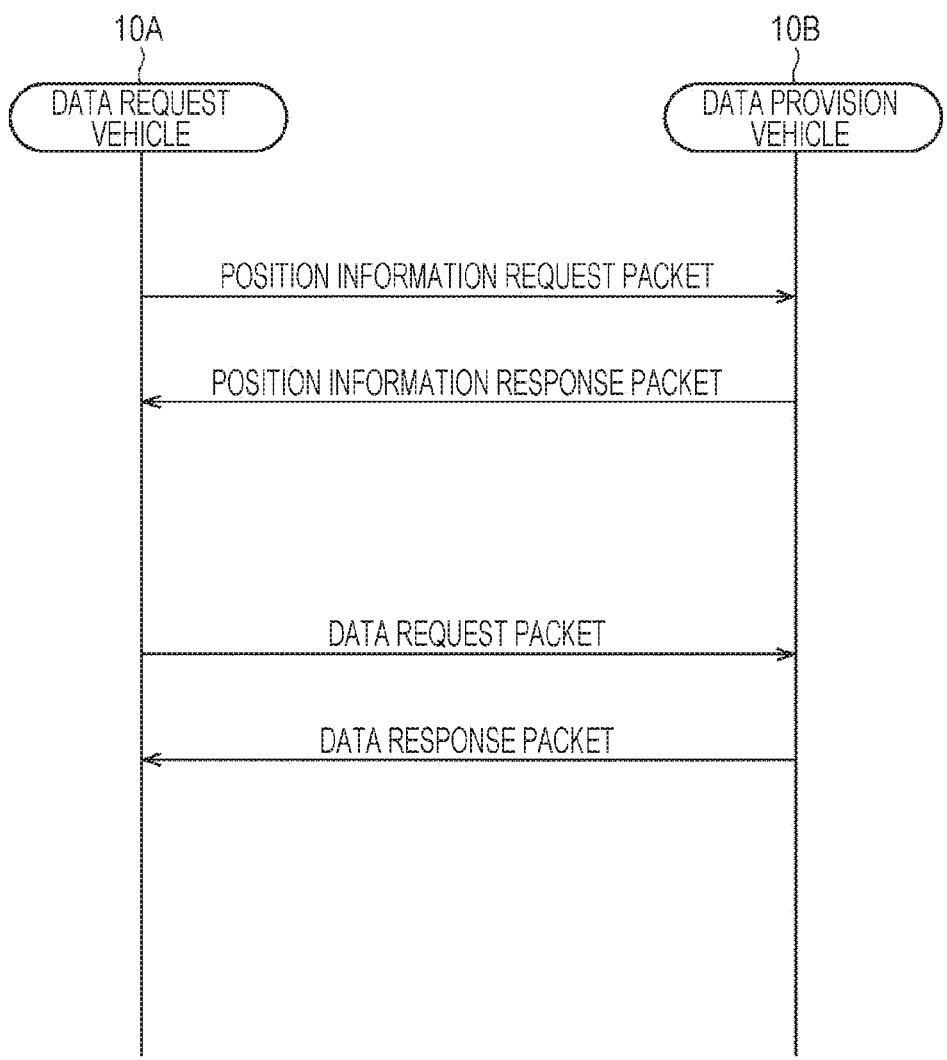

*FIG. 7*

```
{
  "result": {
    "latitude": 57.64911,
    "longitude": 10.40744,
    "time": "20170709T143701+0900"
  },
  "id": 48,
  "version": "1.0"
}
```

FIG. 9

| TYPE | | DETAIL |
|---|---|---|
| POSITION INFORMATION | HOST-CAR-POSITION INFORMATION | |
| | OTHER-CAR-POSITION INFORMATION | ABSOLUTE POSITION, RELATIVE DISTANCE, AND LIKE |
| VEHICLE INFORMATION | CONTROL INFORMATION | SPEED, ACCELERATION, BRAKING, STEERING ANGLE, STATE OF DIRECTION INDICATOR, AND LIKE |
| | VEHICLE SITUATION INFORMATION | GASOLINE REMAINING AMOUNT, TIRE AIR PRESSURE, MAINTENANCE SITUATION, COEFFICIENT OF FRICTION BETWEEN TIRE AND ROAD, FUEL EFFICIENCY, SHAPE OF VEHICLE, AND LIKE |
| DRIVER INFORMATION | | FATIGUE LEVEL, DRIVING HISTORY, DRIVING SKILL, AND LIKE |
| SURROUNDING INFORMATION | ROAD ENVIRONMENT | ROAD SHAPE, STRUCTURE, AND LIKE<br>TRAFFIC LIGHT, TRAFFIC SIGN, ROAD SURFACE MARKING, AND LIKE<br>ROAD SURFACE SITUATION, WEATHER SITUATION, AND LIKE |
| | OBSTACLE INFORMATION | TYPES, POSITIONS, AND LIKE OF PEDESTRIAN, BICYCLE, FALLING OBJECT, AND LIKE |
| | TRAFFIC JAM/CONGESTION INFORMATION | |
| SENSOR DATA | | DATA FROM VARIOUS SENSORS INCLUDING MILLIMETER-WAVE RADAR, MICROWAVE RADAR, LASER RADAR, CAMERA, GNSS RECEIVER, ULTRASONIC SENSOR, MAGNETIC SENSOR, ACOUSTIC SENSOR, INFRARED SENSOR, RADIO WAVE/ELECTRIC FIELD, SENSOR FUSION, AND LIKE |

FIG. 10

| TYPE | DETAIL |
|---|---|
| EXTERNAL SITUATION | WEATHER, SHADE, SUNSHINE<br>TRAFFIC JAM/ACCIDENT INFORMATION<br>CRACKDOWN INFORMATION |
| SURROUNDING FACILITY INFORMATION | CONGESTION LEVEL OF SERVICE AREA OR PARKING LOT<br>GASOLINE PRICE<br>EVENT INFORMATION |

FIG. 11

| TYPE | DETAIL |
|---|---|
| METEOROLOGICAL-PHENOMENON INFORMATION | WIND, RAIN, SUNSHINE AND LIKE |
| TRAVELING INFORMATION | TRAVELING SITUATION OF VEHICLE IN BLIND ANGLE OF DATA ACQUISITION VEHICLE SITUATION OF ROAD IN BLIND ANGLE OF DATA ACQUISITION VEHICLE |

FIG. 12

| VEHICLE-TO-VEHICLE DISTANCE | ACQUIRED DATA |
|---|---|
| VEHICLE-TO-VEHICLE DISTANCE ≤ D1 | SCANNING INFORMATION REGARDING ROAD SURFACE |
| | SITUATION OF ROAD IN ADVANCING DIRECTION |
| | VEHICLE CONTROL INFORMATION |
| D1 < VEHICLE-TO-VEHICLE DISTANCE ≤ D2 | SITUATION OF ROAD IN ADVANCING DIRECTION |
| | VEHICLE CONTROL INFORMATION |
| | INTERSECTION INFORMATION |
| D2 < VEHICLE-TO-VEHICLE DISTANCE ≤ D3 | SITUATION OF ROAD IN ADVANCING DIRECTION |
| | INFORMATION REGARDING EMERGENCY VEHICLE AND DANGEROUSLY DRIVING VEHICLE |
| | ACCIDENT INFORMATION |
| D3 < VEHICLE-TO-VEHICLE DISTANCE ≤ D4 | WEATHER/TRAFFIC JAM INFORMATION |
| | INFORMATION REGARDING GAS STATION |
| | CONGESTION SITUATION OF SERVICE AREA OR PARKING LOT |

INFORMATION PROCESSING APPARATUS, INFORMATION PROCESSING METHOD, AND MOVING OBJECT

CROSS REFERENCE TO RELATED APPLICATIONS

This application is a U.S. National Phase of International Patent Application No. PCT/JP2018/042056 filed on Nov. 14, 2018, which claims priority benefit of Japanese Patent Application No. JP 2017-227732 filed in the Japan Patent Office on Nov. 28, 2017. Each of the above-referenced applications is hereby incorporated herein by reference in its entirety.

TECHNICAL FIELD

The present technology relates to an information processing apparatus, an information processing method, a program, and a moving object, particularly to an information processing apparatus, an information processing method, a program, and a moving object preferably used in a case of sharing data between moving objects.

BACKGROUND ART

Conventionally, it has been proposed to improve communication quality by reducing the congestion level of vehicle to vehicle communication by reducing transmission output as the congestion level of the vehicle to vehicle communication is increased (e.g., see Patent Document 1).

CITATION LIST

Patent Document

Patent Document 1: Japanese Patent Application Laid-Open No. 2005-39665

SUMMARY OF THE INVENTION

Problems to be Solved by the Invention

Unfortunately, in the invention described in Patent Document 1, a transmission range of data is narrowed by reducing transmission output of vehicle to vehicle communication. As a result, there arises a possibility that each vehicle cannot acquire necessary data from another vehicle.

The present technology has been made in view of such a situation, and enables suitable data sharing between moving objects such as vehicles.

Solutions to Problems

An information processing apparatus according to a first aspect of the present technology includes: a data selection unit that selects shared data to be shared between a first moving object and a second moving object on the basis of at least one of a distance between moving objects or a situation of the first moving object, the distance between moving objects being a distance between the first and second moving objects; and a data acquisition unit that acquires the shared data from the second moving object.

An information processing method according to the first aspect of the present technology includes an information processing apparatus: selecting shared data to be shared between a first moving object and a second moving object on the basis of at least one of a distance between moving objects or a situation of the first moving object, the distance between moving objects being a distance between the first and second moving objects; and acquiring the shared data from the second moving object.

A program according to the first aspect of the present technology causes a computer to perform processing of: selecting shared data to be shared between a first moving object and a second moving object on the basis of at least one of a distance between moving objects or a situation of the first moving object, the distance between moving objects being a distance between the first and second moving objects; and acquiring the shared data from the second moving object.

A moving object according to a second aspect of the present technology includes: a data selection unit that selects shared data to be shared with another moving object on the basis of at least one of a distance between moving objects or a situation of the moving object itself, the distance between moving objects being a distance to the other moving object; and a data acquisition unit that acquires the shared data from the other moving object.

An information processing apparatus according to a third aspect of the present technology includes: a data selection unit that selects shared data to be shared between a first moving object and a second moving object on the basis of at least one of a distance between moving objects or a situation of the first moving object, the distance between moving objects being a distance between the first and second moving objects; and a data provision unit that provides the shared data to the first moving object.

In the first aspect of the present technology, shared data to be shared between a first moving object and a second moving object is selected on the basis of at least one of a distance between moving objects or a situation of the first moving object, the distance between moving objects being a distance between the first and second moving objects, and the shared data is acquired from the second moving object.

In the second aspect of the present technology, shared data to be shared with another moving object is selected on the basis of at least one of a distance between moving objects or a situation of the moving object itself, the distance between moving objects being a distance to the other moving object, and the shared data is acquired from the other moving object.

In the third aspect of the present technology, shared data to be shared between a first moving object and a second moving object is selected on the basis of at least one of a distance between moving objects or a situation of the first moving object, the distance between moving objects being a distance between the first and second moving objects, and the shared data is provided to the first moving object.

Effects of the Invention

According to the first to third aspects of the present technology, data can be appropriately shared between moving objects.

Note that the effect described here is not necessarily limited, and any of the effects described in the present disclosure may be obtained.

BRIEF DESCRIPTION OF DRAWINGS

FIG. 3 is a flowchart for illustrating data acquisition processing.

FIG. 4 is a flowchart for illustrating data provision processing.

FIG. 5 is a sequence diagram for illustrating the data acquisition processing and the data provision processing.

FIG. 6 illustrates an example of a position information request packet.

FIG. 7 illustrates an example of a position information response packet.

FIG. 9 illustrates an example of data shared between vehicles in the same advancing direction.

FIG. 10 illustrates an example of data shared between vehicles in the opposite advancing directions.

FIG. 11 illustrates an example of data shared between vehicles traveling in parallel.

FIG. 12 illustrates an example of a case of selecting shared data on the basis of a vehicle-to-vehicle distance.

MODE FOR CARRYING OUT THE INVENTION

An embodiment for carrying out the present technology will be described below. The description will be given in the following order.
1. Configuration Example of Vehicle Control System
2. Embodiment
3. Variations
4. Others

1. Configuration Example of Vehicle Control System

Figure 1:
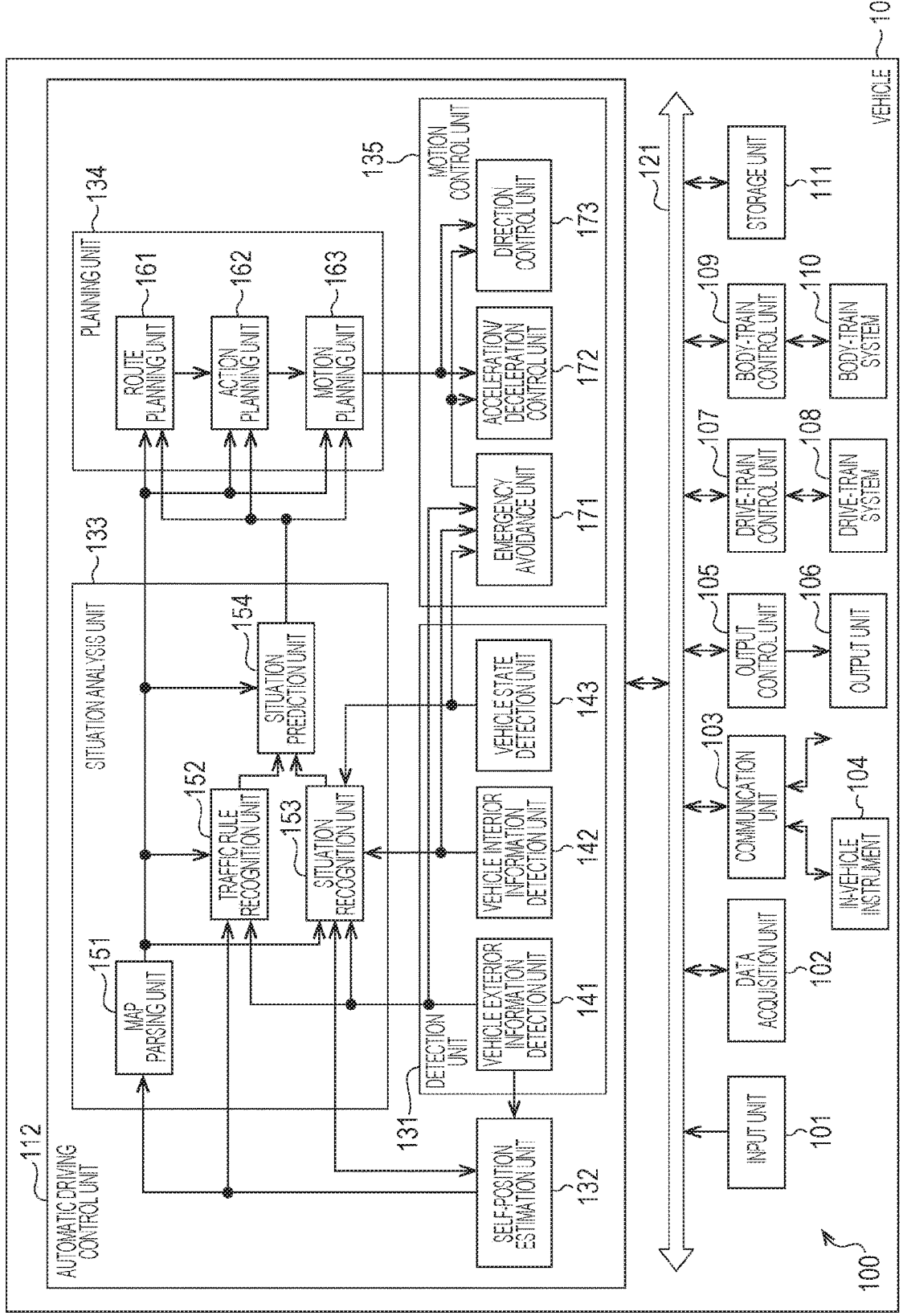
FIG. 1 is a block diagram illustrating a configuration example of a schematic function of a vehicle control system to which the present technology can be applied.

FIG. 1 is a block diagram illustrating a configuration example of a schematic function of a vehicle control system 100, which is one example of a moving object control system to which the present technology can be applied.

The vehicle control system 100 is provided in a vehicle 10, and performs various controls for the vehicle 10. Note that, in a case where the vehicle 10 is distinguished from other vehicles, the vehicle 10 is hereinafter referred to as a host car or a host vehicle.

The vehicle control system 100 includes an input unit 101, a data acquisition unit 102, a communication unit 103, an in-vehicle instrument 104, an output control unit 105, an output unit 106, a drive-train control unit 107, a drive-train system 108, a body-train control unit 109, a body-train system 110, a storage unit 111, and an automatic driving control unit 112. The input unit 101, the data acquisition unit 102, the communication unit 103, the output control unit 105, the drive-train control unit 107, the body-train control unit 109, the storage unit 111, and the automatic driving control unit 112 are mutually connected via a communication network 121. The communication network 121 includes an onboard communication network, a bus, and the like in conformity with any standard, such as, for example, a controller area network (CAN), a local interconnect network (LIN), a local area network (LAN), and FlexRay (registered trademark). Note that each unit of the vehicle control system 100 may be directly connected without the communication network 121.

Note that, in a case where each unit of the vehicle control system 100 performs communication via the communication network 121, description of the communication network 121 is omitted below. For example, in a case where the input unit 101 and the automatic driving control unit 112 communicate via the communication network 121, the input unit 101 and the automatic driving control unit 112 are simply described to communicate with each other.

The input unit 101 includes an apparatus used by a passenger for inputting, for example, various pieces of data and instructions. For example, the input unit 101 includes an operation device such as a touch panel, a button, a microphone, a switch, and a lever, an operation device that enables input by a method other than manual operation, such as voice and a gesture, and the like. Furthermore, for example, the input unit 101 may be a remote-control apparatus using infrared rays or other radio waves, or an external connection instrument such as a mobile device or a wearable device capable of addressing operations of the vehicle control system 100. The input unit 101 generates an input signal on the basis of, for example, data and instructions input by a passenger, and supplies the input signal to each unit of the vehicle control system 100.

The data acquisition unit 102 includes, for example, various sensors for acquiring data used for processing of the vehicle control system 100, and supplies the acquired data to each unit of the vehicle control system 100.

For example, the data acquisition unit 102 includes various sensors for detecting, for example, the state of the vehicle 10. Specifically, for example, the data acquisition unit 102 includes a gyro sensor, an acceleration sensor, an inertial measurement unit (IMU), sensors for detecting, for example, an operation amount of an accelerator pedal, an operation amount of a brake pedal, a steering angle of a steering wheel, an engine speed, a motor speed, and a rotational speed of a wheel, and the like.

Furthermore, for example, the data acquisition unit 102 includes various sensors for detecting information regarding the outside of the vehicle 10. Specifically, for example, the data acquisition unit 102 includes an imaging apparatus such as a time of flight (ToF) camera, a stereo camera, a monocular camera, an infrared camera, and other cameras. Furthermore, for example, the data acquisition unit 102 includes an environment sensor and a surrounding information detection sensor. The environment sensor detects, for example, weather and a meteorological phenomenon. The surrounding information detection sensor detects an object around the vehicle 10. The environment sensor includes, for example, a raindrop sensor, a fog sensor, a sunshine sensor, a snow sensor, and the like. The surrounding information detection sensor includes, for example, an ultrasonic sensor, a radar, light detection and ranging or laser imaging detection and ranging (LiDAR), a sonar, and the like.

Moreover, for example, the data acquisition unit 102 includes various sensors for detecting the current position of the vehicle 10. Specifically, for example, the data acquisition unit 102 includes a global navigation satellite system (GNSS) receiver for receiving a GNSS signal from a GNSS satellite and the like.

Furthermore, for example, the data acquisition unit 102 includes various sensors for detecting information regarding the inside of the vehicle. Specifically, for example, the data acquisition unit 102 includes an imaging apparatus, a biosensor, a microphone, and the like. The imaging apparatus images a driver. The biosensor detects biological information regarding the driver. The microphone collects voice inside the vehicle interior. The biosensor is provided on, for example, a seat surface, a steering wheel, or the like, and detects biological information regarding a passenger sitting on the seat or a driver holding the steering wheel.

The communication unit 103 communicates with the in-vehicle instrument 104, various instruments outside the vehicle, a server, a base station, and the like. The communication unit 103 transmits data supplied from each unit of the vehicle control system 100, and supplies received data to each unit of the vehicle control system 100. Note that a communication protocol supported by the communication unit 103 is not particularly limited. The communication unit 103 can support a plurality of types of communication protocols.

For example, the communication unit 103 wirelessly communicates with the in-vehicle instrument 104 by using, for example, a wireless LAN, Bluetooth (registered trademark), near field communication (NFC), or a Wireless USB (WUSB). Furthermore, for example, the communication unit 103 communicates by wire with the in-vehicle instrument 104 by using, for example, a universal serial bus (USB), a high-definition multimedia interface (HDMI) (registered trademark), or a mobile high-definition link (MHL) via a connection terminal (not illustrated) (and a cable if necessary).

Moreover, for example, the communication unit 103 communicates with an instrument (e.g., application server or control server) on an external network (e.g., the Internet, cloud network, or business-operator-specific network) via a base station or an access point. Furthermore, for example, the communication unit 103 uses peer to peer (P2P) technology to communicate with a terminal (e.g., terminal of pedestrian or shop or machine type communication (MTC) terminal) in the vicinity of the vehicle 10. Moreover, for example, the communication unit 103 performs V2X communication such as vehicle to vehicle communication, vehicle to infrastructure communication, vehicle 10 to home communication, and vehicle to pedestrian communication. Furthermore, for example, the communication unit 103 includes a beacon receiving unit, receives radio waves or electromagnetic waves transmitted from, for example, a radio station installed on a road, and acquires information regarding, for example, the current position, a traffic jam, traffic regulation, or a required period of time.

The in-vehicle instrument 104 includes, for example, a mobile device or wearable device possessed by a passenger, an information instrument that is carried in or attached to the vehicle 10, a navigation apparatus that searches for a route to any destination, and the like.

The output control unit 105 controls output of various pieces of information to the passenger of the vehicle 10 or the outside of the vehicle. For example, the output control unit 105 generates an output signal including at least one of visual information (e.g., image data) or auditory information (e.g., voice data), and supplies the output signal to the output unit 106 to control the output of the visual information and auditory information from the output unit 106. Specifically, for example, the output control unit 105 generates, for example, an overhead image or a panoramic image by combining pieces of data of an image captured by different imaging apparatuses of the data acquisition unit 102, and supplies an output signal including the generated image to the output unit 106. Furthermore, for example, the output control unit 105 generates voice data including, for example, a warning sound or a warning message against danger such as a collision, contact, and entry into a dangerous zone, and supplies an output signal including the generated voice data to the output unit 106.

The output unit 106 includes an apparatus capable of outputting visual information or auditory information to a passenger of the vehicle 10 or the outside of the vehicle. For example, the output unit 106 includes a display apparatus, an instrument panel, an audio speaker, a headphone, a wearable device such as a spectacle-type display worn by a passenger, a projector, a lamp, and the like. The display apparatus provided in the output unit 106 may be an apparatus for displaying visual information in the field of view of a driver, such as, for example, a head-up display, a transmissive display, and an apparatus having an augmented reality (AR) display function in addition to an apparatus having an ordinary display.

The drive-train control unit 107 controls the drive-train system 108 by generating various control signals and supplying the control signals to the drive-train system 108. Furthermore, the drive-train control unit 107 supplies a control signal to each unit other than the drive-train system 108, and gives, for example, a notification of the control state of the drive-train system 108 if necessary.

The drive-train system 108 includes various apparatuses related to a drive train of the vehicle 10. For example, the drive-train system 108 includes a driving force generation apparatus, a driving force transmission mechanism, a steering mechanism, a braking apparatus, an antilock brake system (ABS), an electronic stability control (ESC), an electric power steering apparatus, and the like. The driving force generation apparatus generates driving force for, for example, an internal combustion engine or a driving motor. The driving force transmission mechanism transmits the driving force to a wheel. The steering mechanism adjusts a rudder angle. The braking apparatus generates braking force.

The body-train control unit 109 controls the body-train system 110 by generating various control signals and supplying the control signals to the body-train system 110. Furthermore, the body-train control unit 109 supplies a control signal to each unit other than the body-train system 110, and gives, for example, a notification of the control state of the body-train system 110 if necessary.

The body-train system 110 includes various apparatuses of a body train equipped in a vehicle body. For example, the body-train system 110 includes a keyless entry system, a smart key system, a power window apparatus, a power seat, a steering wheel, an air conditioner, various lamps (e.g., headlamp, back lamp, brake lamp, blinker, fog lamp, and the like), and the like.

The storage unit 111 includes, for example, a magnetic storage device, such as a read only memory (ROM), a random access memory (RAM), and a hard disc drive (HDD), a semiconductor storage device, an optical storage device, a magneto-optical storage device, and the like. The storage unit 111 stores, for example, various programs and data used by each unit of the vehicle control system 100. For example, the storage unit 111 stores data regarding a map such as a three-dimensional high-precision map, a global map, and a local map. The high-precision map includes, for example, a dynamic map. The global map has a precision lower than that of the high-precision map, but covers a wide area. The local map contains information regarding the surroundings of the vehicle 10.

The automatic driving control unit 112 performs control related to automatic driving such as autonomous driving and driving support. Specifically, for example, the automatic driving control unit 112 performs cooperative control for achieving a function of an advanced driver assistance system (ADAS) including, for example, avoidance of collision or shock mitigation for the vehicle 10, following traveling based on a distance between vehicles, vehicle speed maintenance traveling, warning against collision of the vehicle 10, or warning against lane departure of the vehicle 10. Furthermore, for example, the automatic driving control unit 112 performs cooperative control for, for example, automatic driving during which autonomous traveling is performed without depending on the operation of a driver. The automatic driving control unit 112 includes a detection unit 131, a self-position estimation unit 132, a situation analysis unit 133, a planning unit 134, and a motion control unit 135.

The detection unit 131 detects various pieces of information necessary for controlling automatic driving. The detection unit 131 includes a vehicle exterior information detection unit 141, a vehicle interior information detection unit 142, and a vehicle state detection unit 143.

The vehicle exterior information detection unit 141 performs processing of detecting information regarding the outside of the vehicle 10 on the basis of data or a signal from each unit of the vehicle control system 100. For example, the vehicle exterior information detection unit 141 performs processing of detecting, recognizing, and tracking an object around the vehicle 10, and processing of detecting a distance to the object. Examples of an object to be detected include a vehicle, a person, an obstacle, a structure, a road, a traffic light, a traffic sign, a road marking, and the like.

Furthermore, for example, the vehicle exterior information detection unit 141 performs processing of detecting environments around the vehicle 10. The surrounding environment to be detected includes, for example, weather, temperature, humidity, brightness, the condition of a road surface, and the like. The vehicle exterior information detection unit 141 supplies data indicating the result of the detection processing to, for example, the self-position estimation unit 132, a map parsing unit 151, a traffic rule recognition unit 152, and a situation recognition unit 153 of the situation analysis unit 133, and an emergency avoidance unit 171 of the motion control unit 135.

The vehicle interior information detection unit 142 performs processing of detecting information regarding the inside of the vehicle on the basis of data or a signal from each unit of the vehicle control system 100. For example, the vehicle interior information detection unit 142 performs, for example, processing of authenticating and recognizing a driver, processing of detecting the state of the driver, processing of detecting a passenger, and processing of detecting environments inside the car. The state of a driver to be detected includes, for example, a physical condition, an arousal level, a concentration level, a fatigue level, a line-of-sight direction, and the like. The environments inside a vehicle to be detected include, for example, temperature, humidity, brightness, smell, and the like. The vehicle interior information detection unit 142 supplies data indicating the result of the detection processing to, for example, the situation recognition unit 153 of the situation analysis unit 133 and the emergency avoidance unit 171 of the motion control unit 135.

The vehicle state detection unit 143 performs processing of detecting the state of the vehicle 10 on the basis of data or a signal from each unit of the vehicle control system 100. The state of the vehicle 10 to be detected includes, for example, speed, acceleration, a rudder angle, presence/absence and content of abnormality, the state of driving operation, a position and inclination of a power seat, the state of door lock, the states of other onboard instruments, and the like. The vehicle state detection unit 143 supplies data indicating the result of the detection processing to, for example, the situation recognition unit 153 of the situation analysis unit 133 and the emergency avoidance unit 171 of the motion control unit 135.

The self-position estimation unit 132 performs processing of estimating, for example, the position and posture of the vehicle 10 on the basis of data or a signal from each unit of the vehicle control system 100, such as the vehicle exterior information detection unit 141 and the situation recognition unit 153 of the situation analysis unit 133. Furthermore, the self-position estimation unit 132 generates a local map (hereinafter, referred to as a map for self-position estimation) used for self-position estimation if necessary. The map for self-position estimation is a high-precision map using a technique such as, for example, simultaneous localization and mapping (SLAM). The self-position estimation unit 132 supplies data indicating the result of the estimation processing to, for example, the map parsing unit 151 of the situation analysis unit 133, the traffic rule recognition unit 152, and the situation recognition unit 153. Furthermore, the self-position estimation unit 132 stores the map for self-position estimation in the storage unit 111.

The situation analysis unit 133 performs processing of analyzing the situation of the vehicle 10 and the surroundings. The situation analysis unit 133 includes the map parsing unit 151, the traffic rule recognition unit 152, the situation recognition unit 153, and a situation prediction unit 154.

The map parsing unit 151 performs processing of parsing various maps stored in the storage unit 111, and builds a map containing information necessary for processing of automatic driving while using data or a signal from each unit of the vehicle control system 100 such as the self-position estimation unit 132 and the vehicle exterior information detection unit 141 if necessary. The map parsing unit 151 supplies the built map to, for example, the traffic rule recognition unit 152, the situation recognition unit 153, the situation prediction unit 154, and a route planning unit 161, an action planning unit 162, and a motion planning unit 163 of the planning unit 134.

The traffic rule recognition unit 152 performs processing of recognizing a traffic rule around the vehicle 10 on the basis of data or a signal from each unit of the vehicle control system 100, such as the self-position estimation unit 132, the vehicle exterior information detection unit 141, and the map parsing unit 151. For example, the position and state of a signal around the vehicle 10, the content of traffic regulations around the vehicle 10, a travelable lane, and the like are recognized by the recognition processing. The traffic rule recognition unit 152 supplies data indicating the result of the recognition processing to, for example, the situation prediction unit 154.

The situation recognition unit 153 performs processing of recognizing the situation of the vehicle 10 on the basis of data or a signal from each unit of the vehicle control system 100, such as the self-position estimation unit 132, the vehicle exterior information detection unit 141, the vehicle interior information detection unit 142, the vehicle state detection unit 143, and the map parsing unit 151. For example, the situation recognition unit 153 performs processing of recognizing, for example, the situation of the vehicle 10, the situation around the vehicle 10, and the situation of a driver of the vehicle 10. Furthermore, the situation recognition unit 153 generates a local map (hereinafter, referred to as a map for situation recognition) used for recognizing the situation around the vehicle 10 if necessary. The map for situation recognition includes, for example, an occupancy grid map.

The situation of the vehicle 10 to be recognized includes, for example, the position, posture, and movement (e.g., speed, acceleration, movement direction, and the like) of the vehicle 10, presence/absence and content of abnormality, and the like. The situation around the vehicle 10 to be recognized includes, for example, the type and position of a surrounding still object, the type, position, and movement (e.g., speed, acceleration, movement direction, and the like) of a surrounding movable object, the configuration of a surrounding road, the state of the road surface, surrounding weather, temperature, humidity, brightness, and the like. The state of a driver to be recognized includes, for example, a physical condition, an arousal level, a concentration level, a fatigue level, movement of a line-of-sight, driving operation, and the like.

The situation recognition unit 153 supplies data (including a map for situation recognition if necessary) indicating the result of the recognition processing to, for example, the self-position estimation unit 132 and the situation prediction unit 154. Furthermore, the situation recognition unit 153 stores the map for situation recognition in the storage unit 111.

The situation prediction unit 154 performs processing of predicting the situation of the vehicle 10 on the basis of data or a signal from each unit of the vehicle control system 100, such as the map parsing unit 151, the traffic rule recognition unit 152, and the situation recognition unit 153. For example, the situation prediction unit 154 performs processing of predicting, for example, the situation of the vehicle 10, the situation around the vehicle 10, and the situation of a driver.

The situation of the vehicle 10 to be predicted includes, for example, the behavior of the vehicle 10, the occurrence of abnormality, a travelable distance, and the like. The situation around the vehicle 10 to be predicted includes, for example, the behavior of a movable object around the vehicle 10, change in the state of a signal, change in an environment such as weather, and the like. The situation of a driver to be predicted includes, for example, the behavior, physical condition, and the like of the driver.

The situation prediction unit 154 supplies data indicating the result of the prediction processing to, for example, the route planning unit 161, the action planning unit 162, and the motion planning unit 163 of the planning unit 134 together with data from the traffic rule recognition unit 152 and the situation recognition unit 153.

The route planning unit 161 plans a route to a destination on the basis of data or a signal from each unit of the vehicle control system 100, such as the map parsing unit 151 and the situation prediction unit 154. For example, the route planning unit 161 sets a route from the current position to the specified destination on the basis of a global map. Furthermore, for example, the route planning unit 161 appropriately changes the route on the basis of the situation of, for example, a traffic jam, an accident, a traffic regulation, and construction, the physical condition of a driver, and the like. The route planning unit 161 supplies data indicating the planned route to, for example, the action planning unit 162.

The action planning unit 162 plans the action of the vehicle 10 for safe traveling on the route planned by the route planning unit 161 within a planned period of time on the basis of data or a signal from each unit of the vehicle control system 100, such as the map parsing unit 151 and the situation prediction unit 154. For example, the action planning unit 162 makes a plan regarding, for example, start, stop, advancing direction (e.g., forward movement, backward movement, left turn, right turn, change in direction, and the like), traveling lane, traveling speed, and overtaking. The action planning unit 162 supplies data indicating the planned action of the vehicle 10 to, for example, the motion planning unit 163.

The motion planning unit 163 plans the motion of the vehicle 10 for achieving action planned by the action planning unit 162 on the basis of data or a signal from each unit of the vehicle control system 100, such as the map parsing unit 151 and the situation prediction unit 154. For example, the motion planning unit 163 makes a plan regarding, for example, acceleration, deceleration, and traveling tracks. The motion planning unit 163 supplies data indicating the planned motion of the vehicle 10 to, for example, an acceleration/deceleration control unit 172 and a direction control unit 173 of the motion control unit 135.

The motion control unit 135 controls the motion of the vehicle 10. The motion control unit 135 includes the emergency avoidance unit 171, the acceleration/deceleration control unit 172, and the direction control unit 173.

The emergency avoidance unit 171 performs processing of detecting an emergency such as a collision, contact, entry into a dangerous zone, abnormality of a driver, and abnormality of the vehicle 10 on the basis of the detection results of the vehicle exterior information detection unit 141, the vehicle interior information detection unit 142, and the vehicle state detection unit 143. In a case of detecting the occurrence of an emergency, the emergency avoidance unit 171 plans motion of the vehicle 10 for avoiding an emergency such as sudden stop and sudden turn. The emergency avoidance unit 171 supplies data indicating the planned motion of the vehicle 10 to, for example, the acceleration/deceleration control unit 172 and the direction control unit 173.

The acceleration/deceleration control unit 172 performs acceleration/deceleration control for achieving the motion of the vehicle 10 planned by the motion planning unit 163 or the emergency avoidance unit 171. For example, the acceleration/deceleration control unit 172 calculates a control target value of a driving force generation apparatus or a braking apparatus for achieving planned acceleration, deceleration, or sudden stop, and supplies a control command indicating the calculated control target value to the drive-train control unit 107.

The direction control unit 173 performs direction control for achieving the motion of the vehicle 10 planned by the motion planning unit 163 or the emergency avoidance unit 171. For example, the direction control unit 173 calculates a control target value of a steering mechanism for achieving a traveling track or sudden turn planned by the motion planning unit 163 or the emergency avoidance unit 171, and supplies a control command indicating the calculated control target value to the drive-train control unit 107.

2. Embodiment

An embodiment of the present technology will now be described with reference to FIGS. 2 to 16.

Note that the embodiment is mainly related to processing of the data acquisition unit 102, the detection unit 131, and the situation analysis unit 133 of the vehicle control system 100 in FIG. 1.

<Configuration Example of Data Sharing Control System>

Figure 2:
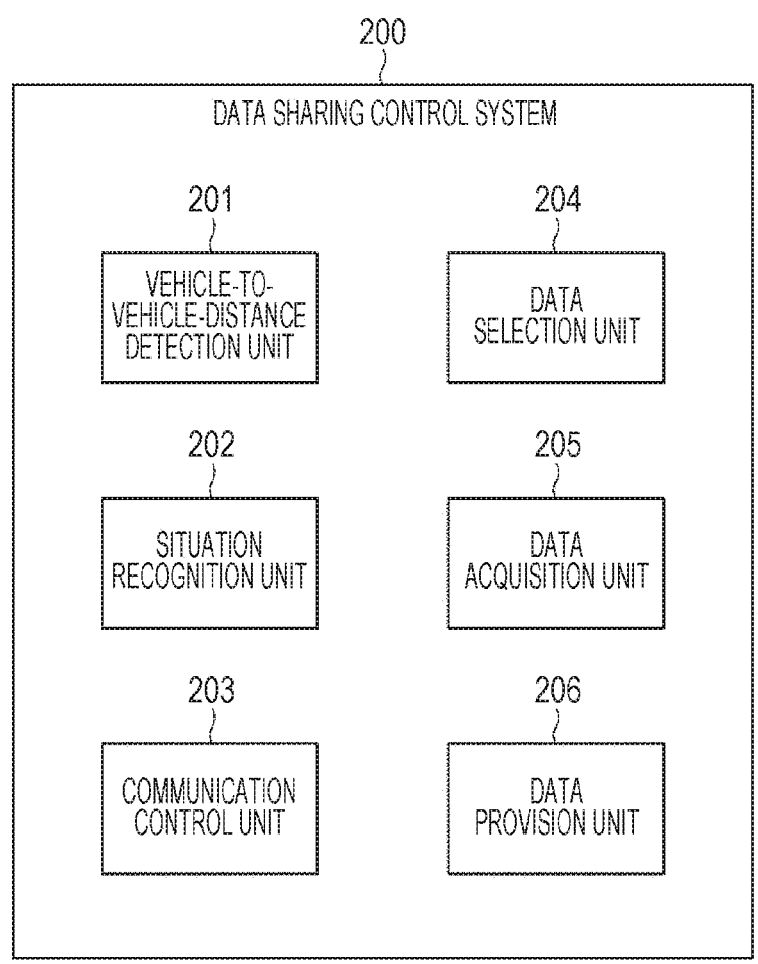
FIG. 2 is a block diagram illustrating one embodiment of a data sharing control system to which the present technology is applied.

FIG. 2 is a block diagram illustrating a configuration example of a data sharing control system 200 according to one embodiment of the present technology.

The data sharing control system 200 controls data sharing between the vehicle 10 provided with the data sharing control system 200 and another vehicle. The data sharing control system 200 includes a vehicle-to-vehicle-distance detection unit 201, a situation recognition unit 202, a communication control unit 203, a data selection unit 204, a data acquisition unit 205, and a data provision unit 206.

The vehicle-to-vehicle-distance detection unit 201 detects a distance (vehicle-to-vehicle distance) between the vehicle 10 and another vehicle on the basis of position information regarding the vehicle 10 estimated by the self-position estimation unit 132 and position information acquired from the other vehicle, which is the opposite party with which data is shared.

The situation recognition unit 202 performs processing of recognizing the situation of the vehicle 10 on the basis of data or a signal from each unit of the vehicle control system 100, such as the self-position estimation unit 132, the vehicle exterior information detection unit 141, the vehicle interior information detection unit 142, the vehicle state detection unit 143, and the map parsing unit 151.

The communication control unit 203 controls communication processing performed by the communication unit 103.

The data selection unit 204 selects data to be shared with the other vehicle on the basis of the vehicle-to-vehicle distance to the other vehicle and the situation of the vehicle 10.

The data acquisition unit 205 acquires data to be shared with the other vehicle from the other vehicle via the communication unit 103 and the communication control unit 203.

The data provision unit 206 provides the data to be shared with the other vehicle to the other vehicle via the communication control unit 203 and the communication unit 103.

<Data Sharing Processing>

Data sharing processing performed between a vehicle 10A and a vehicle 10B will now be described with reference to the flowcharts of FIGS. 3 and 4 and the sequence diagram of FIG. 5.

Note that the vehicle 10A is defined as a vehicle on the side of acquiring data, and is also referred to as a data acquisition vehicle below. Note that the vehicle 10B is defined as a vehicle on the side of providing data, and is also referred to as a data provision vehicle below.

Furthermore, the positional relation between the vehicles 10A and 10B and advancing direction thereof are not particularly limited. For example, the vehicle 10B may be traveling in front of the vehicle 10A, may be traveling behind the vehicle 10A, or may be traveling on a side of the vehicle 10A. Furthermore, for example, the vehicles 10A and 10B may advance in the same direction, or in the different direction (e.g., opposite direction).

Note that a case where the vehicle 10B is traveling in front of the vehicle 10A in the same direction as the vehicle 10A, that is, a case where the vehicle 10B is a preceding vehicle of the vehicle 10A will be described below as a main example.

<Data Acquisition Processing>

First, data acquisition processing performed by the vehicle 10A will be described with reference to the flowchart of FIG. 3. Note that, in the processing, the vehicle 10A is also referred to as a host vehicle below.

The processing is started, for example, when an operation for starting up the vehicle 10A and starting driving is performed, for example, when an ignition switch, a power switch, a start switch, or the like of the vehicle 10A is turned on.

In Step S1, the vehicle 10A requests position information regarding the data provision vehicle (vehicle 10B).

Specifically, the data acquisition unit 205 generates a position information request packet. As illustrated in FIG. 5, the data acquisition unit 205 transmits the position information request packet to the vehicle 10B via the communication control unit 203 and the communication unit 103.

FIG. 6 illustrates an example of the position information request packet. The position information request packet includes method, id, and version.

In method, getPositionData indicating a request for position information is set.

A request number is set in id. In the example, 48 is set.

Version indicates a version of the specification of the packet. In the example, 1.0 is set.

In contrast, the vehicle 10B receives the position information request packet in Step S51 in FIG. 4, and transmits a position information response packet of vehicle 10B in Step S53.

FIG. 7 illustrates an example of the position information response packet. The position information response packet includes result, id, and version.

Result indicates the execution result of getPositionData, which is method of the position information request packet. Result includes latitude, longitude, and time. Latitude represents latitude. Longitude represents longitude. Time represents the time of acquiring position information.

The same request number as that of the corresponding position information request packet is set in id. In the example, 48 is set.

Version indicates a version of the specification of the packet. In the example, 1.0 is set.

In Step S2, the vehicle 10A receives position information. Specifically, as illustrated in FIG. 5, the data acquisition unit 205 receives the position information response packet from the vehicle 10B via the communication unit 103 and the communication control unit 203.

In Step S3, the vehicle-to-vehicle-distance detection unit 201 acquires the position information regarding the host vehicle (vehicle 10A) from the self-position estimation unit 132.

In Step S4, the vehicle-to-vehicle-distance detection unit 201 calculates a vehicle-to-vehicle distance. Specifically, the vehicle-to-vehicle-distance-detection unit 201 calculates the distance between the vehicles 10A and 10B on the basis of the position information regarding the vehicle 10A and the position information regarding the vehicle 10B.

In Step S5, the situation recognition unit 202 acquires various pieces of data and signals. For example, the situation recognition unit 202 acquires data or a signal from each unit of the vehicle control system 100, such as the self-position estimation unit 132, the vehicle exterior information detection unit 141, the vehicle interior information detection unit 142, the vehicle state detection unit 143, and the map parsing unit 151.

In Step S6, the situation recognition unit 202 performs processing of recognizing the situation of the host vehicle (vehicle 10A) on the basis of the data and the signal acquired in the processing of Step S5. For example, the situation recognition unit 202 performs processing of recognizing, for example, the situation of the vehicle 10A, the situation around the vehicle 10A, and the situation of a driver of the vehicle 10A.

The situation of the vehicle 10A to be recognized includes, for example, the position, posture, and movement (e.g., speed, acceleration, movement direction, and the like) of the vehicle 10A, presence/absence and content of abnormality, and the like. The situation around the vehicle 10A to be recognized includes, for example, the type and position of a surrounding still object, the type, position, and movement (e.g., speed, acceleration, movement direction, and the like) of a surrounding movable object, the configuration of a surrounding road, the state of the road surface, surrounding weather, temperature, humidity, brightness, and the like. The state of a driver to be recognized includes, for example, a physical condition, an arousal level, a concentration level, a fatigue level, movement of a line-of-sight, driving operation, and the like.

In Step S7, the data acquisition unit 205 selects data to be shared on the basis of the vehicle-to-vehicle distance and the situation of the host vehicle (vehicle 10A).

Here, an example of data to be shared by the vehicle 10A acquiring the data from the vehicle 10B will be described with reference to FIGS. 8 to 11.

Figure 8:
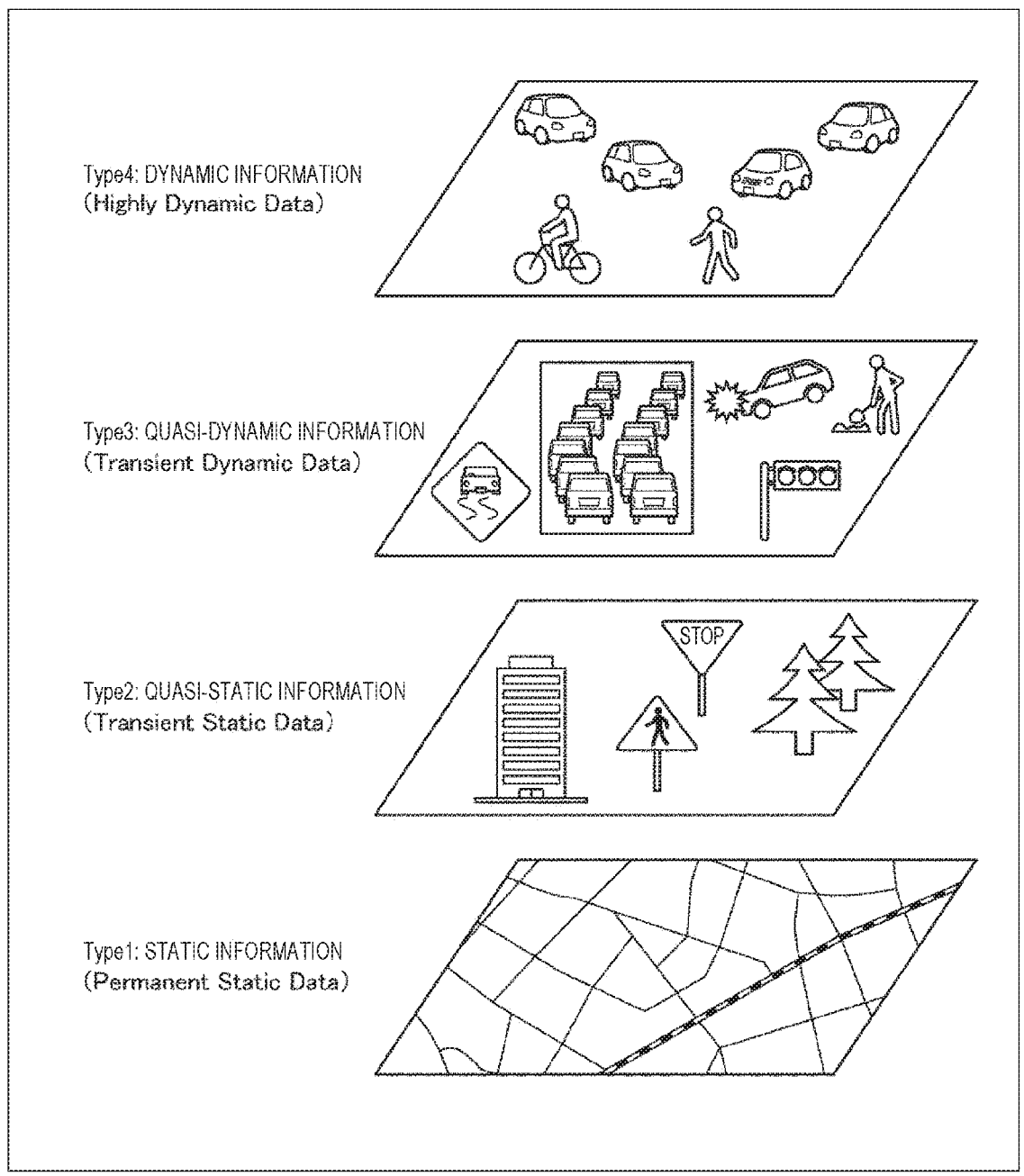
FIG. 8 illustrates an example of hierarchical structure of a dynamic map.

FIG. 8 illustrates an example of hierarchical structure of a dynamic map used by the vehicles 10A and 10B for, for example, self-position recognition and automatic driving.

The dynamic map has structure of four-layer of Types 1 to 4.

Type 1 includes static information (permanent static data). The static information includes, for example, a road map.

Type 2 includes quasi-static information (transient static data). The quasi-static information includes, for example, a road sign and a landmark.

Type 3 includes quasi-dynamic information (transient dynamic data). The quasi-dynamic information includes, for example, road surface information and traffic jam information. The road surface information indicates the state of a traffic light and the state of a road surface.

Type 4 includes dynamic information (highly dynamic data). The dynamic information includes, for example, the position, posture, and the like of a movable object such as a host vehicle, another vehicle, a bicycle, and a pedestrian.

The data shared between the vehicles 10A and 10B is directed to, for example, the quasi-dynamic information of Type 3 and dynamic information of Type 4 of the dynamic map. That is, the quasi-dynamic information of Type 3 and dynamic information of Type 4 of the dynamic map are complemented by sharing data between the vehicles 10A and 10B.

FIG. 9 illustrates an example of data shared between the vehicles 10A and 10B in a case where the vehicles are advancing in the same direction.

For example, position information is shared. The position information includes, for example, host-car-position information, that is, position information regarding the vehicle 10B. Furthermore, the position information includes, for example, other-car-position information, for example, an absolute position of another vehicle around the vehicle 10B, a relative distance between the vehicle 10B and the other vehicle, and the like.

Furthermore, for example, vehicle information regarding the vehicle 10B is shared. The vehicle information includes, for example, control information of the vehicle 10B. The control information includes, for example, speed, acceleration, braking, a steering angle, the state of a direction indicator, and the like. Furthermore, the vehicle information includes, for example, the vehicle situation information regarding the vehicle 10B. The vehicle situation information includes, for example, a gasoline remaining amount, tire air pressure, maintenance situation, a coefficient of friction between a tire and a road, fuel efficiency, the shape of the vehicle 10B, and the like.

Moreover, for example, information regarding a driver of the vehicle 10B is shared. The driver information includes, for example, a fatigue level, driving history, driving skill, and the like of a driver.

Furthermore, for example, surrounding information regarding the surroundings of the vehicle 10B is shared. The surrounding information includes, for example, a road environment around the vehicle 10B. The road environment includes, for example, the shape, structure, and the like (e.g., curvature, width, lane, intersection, branch, and surrounding structure) of a road. Furthermore, the road environment includes, for example, a traffic light, a traffic sign, and a road surface marking. Moreover, the road environment includes, for example, a road surface situation and a weather situation. Furthermore, the surrounding information includes, for example, information regarding an obstacle around the vehicle 10B. The obstacle information includes, for example, types, positions, and the like of a pedestrian, a bicycle, a falling object, and the like. Moreover, the surrounding information includes, for example, information regarding a traffic jam/congestion around the vehicle 10B.

Moreover, for example, sensor data acquired by the vehicle 10B is shared. The sensor data includes, for example, data from various sensors in, for example, a millimeter-wave radar, a microwave radar, a laser radar, a camera, a GNSS receiver, an ultrasonic sensor, a magnetic sensor, an acoustic sensor, an infrared sensor, a radio wave/electric field sensor, a sensor fusion including a plurality of sensors, and the like.

Note that raw sensor data does not necessarily need to be shared, and data obtained by processing the sensor data may be shared. For example, data obtained by extracting a part of the sensor data may be shared. In the case, for example, data to a direction in which an obstacle or the like exists, data regarding a time zone in which an obstacle exists, and the like are extracted and shared. Furthermore, for example, data obtained by abstracting the sensor data may be shared. For example, data indicating the position of an obstacle detected on the basis of the sensor data and the like may be shared.

FIG. 10 illustrates an example of data shared between the vehicles 10A and 10B in a case where the vehicles 10A and 10B are advancing in the opposite directions, that is, the vehicles 10A and 10B face each other.

In a case where the vehicles 10A and 10B face each other, for example, data regarding a place (hereinafter, referred to as a place to be passed through) which the vehicle 10A is to pass through and the vehicle 10B has passed through, is shared.

For example, an external situation of the place to be passed through is shared. The external situation includes information regarding, for example, weather, shade, sunshine, and the like. Furthermore, the external situation includes information regarding, for example, a traffic jam and an accident. Moreover, the external situation includes, for example, crackdown information.

Furthermore, for example, information regarding a facility around the place to be passed through is shared. The surrounding facility information includes, for example, the congestion level of a service area or a parking lot. Furthermore, the surrounding facility information includes, for example, a gasoline price of a gas station around the place to be passed through. Moreover, the surrounding facility information includes, for example, information regarding an event of a shop, an area, and the like around the place to be passed through.

Note that the data acquired by the vehicle 10A from the oncoming vehicle 10B can also be acquired from a vehicle traveling at the place to be passed through by the vehicle 10A in front of the vehicle 10A. Note, however, that, since a communication distance is shortened in a case where the data is acquired from the oncoming vehicle 10B, communication quality can be improved, and power consumption can be reduced. In contrast, the real-time performance of obtained information is improved in a case where the data is acquired from a vehicle in front.

FIG. 11 illustrates an example of data shared between the vehicles 10A and 10B in a case where the vehicles 10A and 10B are adjacent in a lateral direction within a predetermined range (e.g., within 2 m) and traveling in the same direction, that is, where the vehicles 10A and 10B are traveling in parallel.

For example, environmental information regarding a course (e.g., lane in which the vehicle 10B is traveling) on which the vehicle 10B is moving is shared. The environmental information includes, for example, the direction, intensity, and the like of wind and rain in the lane in which the vehicle 10B is traveling. Furthermore, the environmental information includes, for example, whether the lane in which the vehicle 10B is traveling is in the sun or in the shade, the direction and intensity of sunlight in the lane in which the vehicle 10B is traveling, and the like. The situation of, for example, wind, rain, and sunshine may greatly differ from lane to lane depending on, for example, the position and size of a surrounding vehicle, a wall, a fence, and a mountain.

Furthermore, for example, traveling information regarding a place of blind angle of the vehicle 10A caused by the vehicle 10B is shared. The traveling information includes, for example, a traveling situation (e.g., speed, vehicle type, size, and the like) of, for example, a vehicle (e.g., a four-wheeled vehicle, a motorcycle, and the like) in the blind angle of the data acquisition vehicle (vehicle 10A) caused by the vehicle 10B. Furthermore, the traveling information includes, for example, a situation (e.g., unevenness, friction, puddle of water, puddle of snow, obstacle, and the like) of a road in the blind angle of the data acquisition vehicle (vehicle 10A) caused by the vehicle 10B.

Here, an example of a case of selecting shared data on the basis of the vehicle-to-vehicle distance between the vehicles 10A and 10B will be described with reference to FIG. 12.

The example is classified into four cases of, for example, vehicle-to-vehicle distance≤D1 (e.g., 2 m), D1<vehicle-to-vehicle distance≤D2 (e.g., 5 m), D2<vehicle-to-vehicle distance≤D3 (e.g., 100 m), and D3<vehicle-to-vehicle distance≤D4 (e.g., 10 km).

First, the case of vehicle-to-vehicle distance≤D1 will be described.

In the case, for example, data used for estimating the self-position of the vehicle 10A is selected as the shared data. Specifically, for example, in a case where the vehicle 10B is traveling in front of the vehicle 10A and a road surface in front of the vehicle 10A cannot be scanned with, for example, LiDAR due to the vehicle 10B, scanning information regarding a road surface in front of the vehicle 10B is selected as the shared data.

Note that, in a case where a road surface in front of the vehicle 10B cannot be scanned due to a vehicle further in front of the vehicle 10B, the road surface scanning information may be acquired from the vehicle in front of the vehicle 10B. Furthermore, a vehicle to share the road surface scanning information may be advanced forward to a vehicle capable of acquiring the road surface scanning information. Note, however, that a target vehicle for acquiring the road surface scanning information is desirably limited to be within a range used for estimating the self-position of the vehicle 10A.

Furthermore, for example, in a case where the vehicle 10B is traveling behind the vehicle 10A and a road surface behind the vehicle 10A cannot be scanned with, for example, LiDAR due to the vehicle 10B, scanning information regarding a road surface behind the vehicle 10B is selected as the shared data.

Note that, in a case where a road surface behind the vehicle 10B cannot be scanned due to a vehicle further behind the vehicle 10B, the road surface scanning information may be acquired from the vehicle behind the vehicle 10B. Furthermore, a vehicle to share the road surface scanning information may be advanced backward to a vehicle capable of acquiring the road surface scanning information. Note, however, that a target vehicle for acquiring the road surface scanning information is desirably limited to be within a range used for the self-position estimation.

Furthermore, for example, in a case where the vehicle 10B or the like is close and the situation (e.g., unevenness and the like) of a road in the advancing direction cannot be detected, the situation of the road in the advancing direction of the vehicle 10B is selected as the shared data.

Moreover, for example, control information of the vehicle 10B, such as a brake pedal depressed amount and an accelerator pedal depressed amount, is selected as shared data. The control information is used, for example, to prevent a rear-end collision of the vehicle 10B due to sudden braking, to control traveling in alignment with the vehicle 10B, and the like.

Next, the case of D1<vehicle-to-vehicle distance D2 will be described.

In this case, for example, similarly to the case of vehicle-to-vehicle distance≤D1, the situation of a road in the advancing direction of the vehicle 10B is selected as the shared data.

Furthermore, for example, similarly to the case of vehicle-to-vehicle distance≤D1, control information of the vehicle 10B is selected as the shared data.

Note that, in a case where the vehicles 10A is traveling in alignment, control information of a vehicle of a head of the alignment to a vehicle immediately before the vehicle 10A may be shared. Furthermore, for example, the range of sharing the control information may be limited to the range having influence on the vehicle 10A in a case where a vehicle in front applies a brake. For example, in a case where a vehicle is moved forward from the vehicle immediately before the vehicle 10A one by one, and the vehicle comes to a location where a distance between vehicles is equal to or greater than a predetermined distance, the range to a back-side vehicle among a front-side vehicle and a back-side vehicle may be set as the range of sharing the control information. At a place between the front-side vehicle and the back-side vehicle, the distance between vehicles are secured.

Furthermore, for example, control information of a vehicle immediately behind the vehicle 10A to a vehicle on the end of the alignment may be shared.

Moreover, for example, in a case where an intersection with poor visibility is placed in the advancing direction of the vehicle 10A, intersection information is selected as the shared data. The intersection information includes, for example, information regarding vehicles moving in directions to enter an intersection from right and left, the state of a traffic light of the intersection, and the like.

Note that the vehicle acquiring the intersection information is desirably limited to a vehicle that enters the intersection and has information having influence on the vehicle 10A.

Next, the case of D2<vehicle-to-vehicle distance≤D3 will be described.

In this case, for example, similarly to the cases of vehicle-to-vehicle distance≤D1 and D1<vehicle-to-vehicle distance≤D2, the situation of a road in the advancing direction of the vehicle 10B is selected as the shared data.

Furthermore, for example, information regarding the situation around the vehicle 10B is selected as the shared data. Specifically, for example, information regarding an emergency vehicle around the vehicle 10B and a dangerously driving vehicle is selected as the shared data. Furthermore, for example, information regarding an accident around the vehicle 10B is selected as the shared data.

Next, the case of D3<vehicle-to-vehicle distance≤D4 will be described.

In the case, for example, information regarding the situation around the vehicle 10B is selected as the shared data. Specifically, for example, information regarding weather and a traffic jam around the vehicle 10B is selected as the shared data. Furthermore, for example, information regarding a gas station around the vehicle 10B is selected as the shared data. The information regarding a gas station includes, for example, charges and congestion situation of the gas station. Moreover, for example, the congestion situation of a service area around the vehicle 10B and the congestion situation of a parking lot of, for example, a convenience store are selected as the shared data.

An example of a case where shared data is selected on the basis of the situation of the vehicle 10A will now be described.

For example, in a case where there are many other vehicles around the vehicle 10A, a traffic jam is assumed.

In the case, in a case where the vehicle 10B is immediately before the vehicle 10A, the concentration level of a driver is selected as the shared data. The concentration level of a driver is used for, for example, preventing an accident and avoiding a dangerously driving vehicle.

Furthermore, for example, the speed of the vehicle 10B is selected as the shared data. For example, the position where a traffic jam is to be eliminated is grasped on the basis of the vehicle-to-vehicle distance to the vehicle 10B and the speed of the vehicle 10B.

Moreover, for example, the movement distance per predetermined period of time of the vehicle 10B is selected as the shared data. Then, a lane with a smoother flow can be found by acquiring and comparing movement distances per predetermined period of time from vehicles in a plurality of lanes.

Furthermore, for example, the shared data is selected on the basis of the result of comparing the vehicle-to-vehicle distance between the vehicles 10A and 10B with the stopping distance of the vehicle 10A. For example, in a case where the vehicle-to-vehicle distance is longer than the stopping distance of the vehicle 10A, obstacle information regarding an obstacle around the vehicle 10B is selected as the shared data. In contrast, for example, in a case where the vehicle-to-vehicle distance is shorter than the stopping distance of the vehicle 10A, the obstacle information is not selected as the shared data since the vehicle 10A cannot avoid the obstacle even if the obstacle information is acquired. This avoids unnecessary data sharing.

Note that, for example, the stopping distance of the vehicle 10A is calculated by the sum of a free running distance and a braking distance on the basis of the speed of the vehicle 10A.

Moreover, in a case where a road in the advancing direction of the vehicle 10A has two or more lanes, the shared data is selected on the basis of a result obtained by comparing the vehicle-to-vehicle distance between the vehicles 10A and 10B and a distance (hereinafter, referred to as a lane changeable distance) in which the vehicle 10A can change lanes. For example, in a case where the vehicle-to-vehicle distance is longer than the lane changeable distance of the vehicle 10A, the obstacle information is selected as the shared data. In contrast, for example, in a case where the vehicle-to-vehicle distance is shorter than the lane changeable distance of the vehicle 10A, the obstacle information is not selected as the shared data since the vehicle 10A cannot avoid the obstacle even if the obstacle information is acquired. This avoids unnecessary data sharing.

Note that the lane changeable distance is calculated on the basis of, for example, the speed of the vehicle 10A.

Furthermore, for example, the shared data is selected on the basis of a time zone during traveling. For example, during the night, an amount of streetlights around the vehicle 10B, brightness of a road, and the like are selected as the shared data. Furthermore, for example, in the early morning or evening, the entering amount of the morning sun or sunset around the vehicle 10B is selected as the shared data.

Moreover, for example, the shared data is selected on the basis of the state of a road in which the vehicle 10A is traveling. For example, in a case where the vehicle 10A is traveling on a snowy road or a slope, inclination information of a road around the vehicle 10B is selected as the shared data. Furthermore, for example, in a case where the vehicle 10A is traveling on a wet road or a snowy road, slip information of a road around the vehicle 10B is selected as the shared data.

In Step S8, the vehicle 10A requests the selected data. Specifically, the data acquisition unit 205 generates a data request packet for requesting transmission of the selected data. As illustrated in FIG. 5, the data acquisition unit 205 transmits the data request packet to the vehicle 10B via the communication control unit 203 and the communication unit 103.

In contrast, the vehicle 10B receives the data request packet in Step S54 in FIG. 4, and transmits a data response packet including the requested data in Step S56.

In Step S9, the vehicle 10A receives the selected data. Specifically, as illustrated in FIG. 5, the data acquisition unit 205 receives the data response packet from the vehicle 10B via the communication unit 103 and the communication control unit 203.

In Step S10, the vehicle 10A determines whether or not to end the processing. In a case where the processing is determined not to be ended, the processing returns to Step S1, and the processing after Step S1 is performed.

In contrast, in Step S10, the processing is determined to be ended, for example, when operation for ending the driving of the vehicle 10A is performed, for example, when an ignition switch, a power switch, a start switch, or the like of the vehicle 10A is turned off. The data acquisition processing is ended.

Data provision processing performed by the vehicle 10B will now be described in accordance with the data acquisition processing in FIG. 3 with reference to the flowchart of FIG. 4. Note that, in the processing, the vehicle 10B is also referred to as a host vehicle below.

The processing is started, for example, when an operation for starting up the vehicle 10B and starting driving is performed, for example, when an ignition switch, a power switch, a start switch, or the like of the vehicle 10B is turned on.

In Step S51, the data provision unit 206 determines whether or not position information has been requested. In a case of receiving the position information request packet from the vehicle 10A via the communication unit 103 and the communication control unit 203, the data provision unit 206 determines that the position information has been requested, and the processing proceeds to Step S52.

In Step S52, the data provision unit 206 acquires the position information regarding the host vehicle (vehicle 10B) from the self-position estimation unit 132.

In Step S53, the data provision unit 206 transmits the position information. Specifically, the data provision unit 206 generates a position information response packet including the position information regarding the host vehicle. As illustrated in FIG. 5, the data provision unit 206 transmits the position information response packet to the vehicle 10A via the communication control unit 203 and the communication unit 103. Thereafter, the processing proceeds to Step S54.

In contrast, in a case of not receiving the position information request packet, the data provision unit 206 determines that the position information has not been request in Step S51. The processing of Steps S52 and S53 is skipped, and the processing proceeds to Step S54.

In Step S54, the data provision unit 206 determines whether or not data has been requested. In a case of receiving the data request packet from the vehicle 10A via the communication unit 103 and the communication control unit 203, the data provision unit 206 determines that the data has been requested, and the processing proceeds to Step S55.

In Step S55, the data provision unit 206 acquires the requested data. For example, the data provision unit 206 acquires data that has been requested by the vehicle 10A from each unit of the vehicle control system 100, such as the data acquisition unit 102, the self-position estimation unit 132, the vehicle exterior information detection unit 141, the vehicle interior information detection unit 142, the vehicle state detection unit 143, and the map parsing unit 151.

In Step S56, the data provision unit 206 transmits the acquired data to the vehicle 10A. Specifically, the data provision unit 206 generates a data response packet including the acquired data. As illustrated in FIG. 5, the data provision unit 206 transmits the data response packet to the vehicle 10A via the communication control unit 203 and the communication unit 103.

Thereafter, the processing proceeds to Step S57.

In contrast, in a case where it is determined that the data has not been requested in Step S54, the processing of Steps S55 and S56 is skipped, and the processing proceeds to Step S57.

In Step S57, the vehicle 10B determines whether or not to end the processing. In a case where the processing is determined not to be ended, the processing returns to Step S51, and the processing after Step S51 is performed.

In contrast, in Step S57, the processing is determined to be ended, for example, when operation for ending the driving of the vehicle 10B is performed, for example, when an ignition switch, a power switch, a start switch, or the like of the vehicle 10B is turned off. The data provision processing is ended.

As described above, data can be shared between the vehicles 10A and 10B. Then, the vehicle 10A can effectively use the data acquired from the vehicle 10B for, for example, automatic driving, self-position estimation, and finding an obstacle, and can travel more safely and comfortably.

Furthermore, necessary data is shared between the vehicles 10A and 10B, and sharing of unnecessary data is avoided. This reduces unnecessary communication between the vehicles 10A and 10B, and leads to reduction of communication traffic and power saving. Furthermore, reduction of shared data can reduce a required capacity of a storage medium.

<Example of Method of Communication Between Vehicles>

An example of a communication method in a case where data is shared between vehicles will now be described with reference to FIGS. 13 to 15. Note that the communication unit 103 performs communications in FIGS. 13 and 15 under the control of the communication control unit 203, for example.

Figure 13:
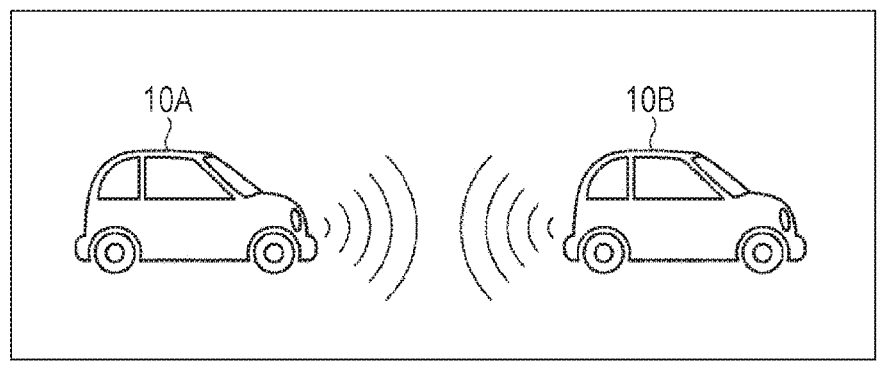
FIG. 13 illustrates an example in which direct communication is performed between vehicles and data is shared.

For example, as illustrated in FIG. 13, the vehicles 10A and 10B can directly communicate with each other.

Figure 14:
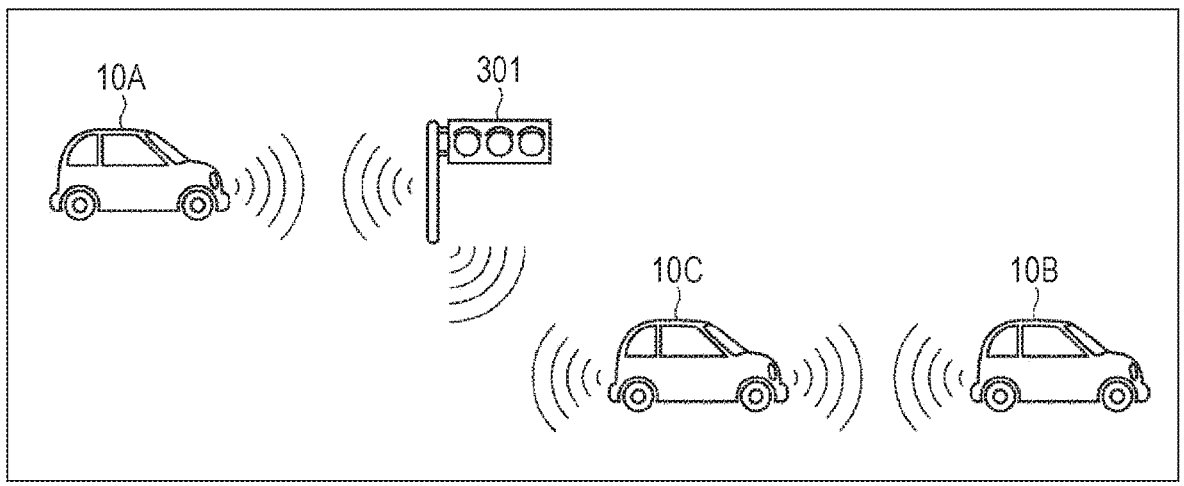
FIG. 14 illustrates an example in which communication is performed between vehicles via hops and data is shared.

Furthermore, for example, as illustrated in FIG. 14, the vehicles 10A and 10B may communicate with each other via one or more hops. Another vehicle such as a vehicle 10C and a traffic safety facility such as a traffic light 301 can be used as the hop. Note that examples of the traffic safety facility other than the traffic light 301 include a road sign and the like. Furthermore, a facility (e.g., building and the like) other than the traffic safety facility can be used as the hop.

Note that the number of hops can be set optionally. For example, the vehicle 10A may specify the number of hops, and share data with a vehicle separated by the specified number of hops.

Figure 15:
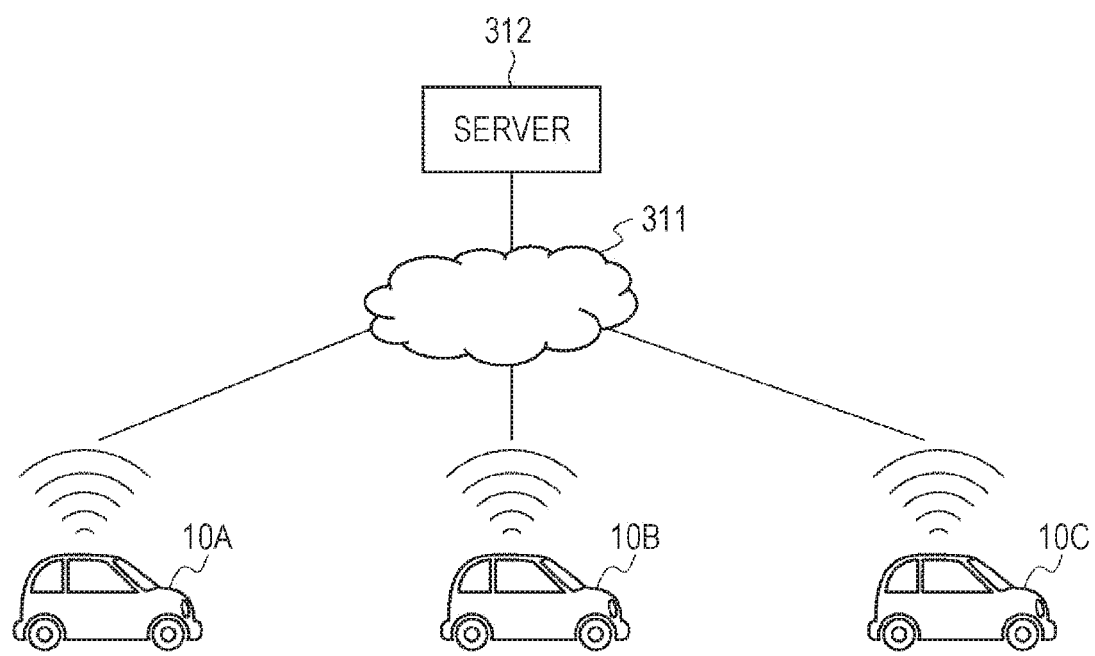
FIG. 15 illustrates an example in which communication is performed via a server and a network and data is shared.

Furthermore, for example, as illustrated in FIG. 15, the vehicles 10A to 10C may communicate with one another via a network 311.

Alternatively, for example, the vehicles 10A to 10C may communicate with one another via the network 311 and a server 312. In the case, for example, data is shared between the vehicles 10 by each vehicle 10 uploading the data to the server 312 and each vehicle 10 downloading data of another vehicle from the server 312.

<IP Address Acquisition Processing>

Figure 16:
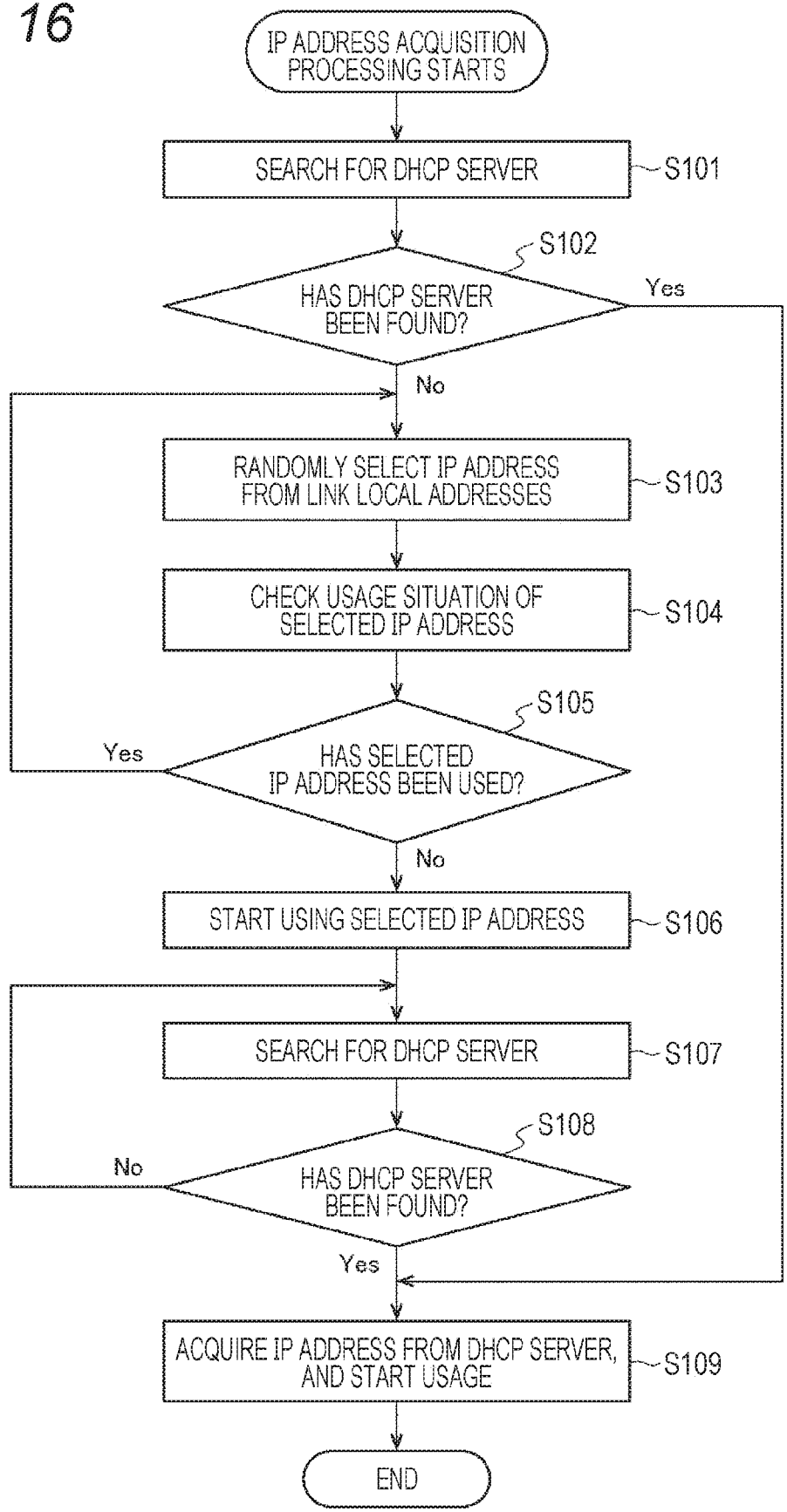
FIG. 16 is a flowchart for illustrating IP address acquisition processing.

IP address acquisition processing performed by the vehicle 10 will now be described with reference to the flowchart of FIG. 16. The processing is started, for example, at the time when an electric system of the vehicle 10 is turned on.

In Step S101, the communication control unit 203 searches for a dynamic host configuration protocol (DHCP) server (not illustrated). For example, the communication control unit 203 transmits DHCPDISCOVER via the communication unit 103.

In Step S102, the communication control unit 203 determines whether or not the DHCP server has been found. In a case where DHCPOFFER is not received for DHCPDISCOVER, the communication control unit 203 determines that the DHCP server has not been found, and the processing proceeds to Step S103.

In Step S103, the communication control unit 203 randomly selects an IP address from link local addresses (169.254.0.0 to 169.254.255.255).

In Step S104, the communication control unit 203 checks the usage situation of the selected IP address by transmitting an ARP Probe via the communication unit 103.

In Step S105, the communication control unit 203 determines whether or not the selected IP address has been used on the basis of the result of the processing of Step S104. In a case where the selected IP address is determined to be used, the processing returns to Step S103.

Thereafter, the processing of Steps S103 to S105 is repeatedly performed until the selected IP address is determined to be used in Step S105.

In contrast, in a case where the selected IP address is determined not to be used in Step S105, the processing proceeds to Step S106.

In Step S106, the communication control unit 203 starts using the IP address selected in the processing of Step S103.

In Step S107, the DHCP server is searched for by a processing similar to that of Step S101.

In Step S108, it is determined whether or not the DHCP server has been found similarly to the processing of Step S102. In a case where it is determined that the DHCP server has not been found, the processing returns to Step S107.

Thereafter, the processing of Steps S107 and S108 is repeatedly performed until the DHCP server is determined to have been found in Step S108.

In contrast, in a case where the DHCP server is determined to have been found in Step S102 or S108, the processing proceeds to Step S109.

In Step S109, the communication control unit 203 acquires an IP address from the DHCP server via the communication unit 103, and starts using the IP address.

Thereafter, the IP address acquisition processing is ended.

In this way, the communication control unit 203 can acquire an IP address, and perform communication.

3. Variations

Variations of the above-described embodiment of the present technology will be described below.

Although, in the above description, an example in which a data acquisition vehicle selects shared data has been described, a data provision vehicle can select the shared data. For example, the data provision vehicle can select the shared data on the basis of at least one of a vehicle-to-vehicle distance to the data acquisition vehicle or the situation of the data acquisition vehicle. In the case, the data provision vehicle selects the shared data, and transmits the selected data to the data acquisition vehicle. This is effective, for example, in a case of transmitting data from a data provision vehicle to a data acquisition vehicle in an emergency such as an accident without waiting for a request from the data acquisition vehicle.

Furthermore, the present technology can be applied to both of an automatically driving vehicle and a manually driving vehicle.

Moreover, in addition to the above-exemplified vehicles, the present technology can be applied to a case of sharing data between various moving objects such as a motorcycle, a bicycle, a personal mobility, an airplane, a ship, a construction machine, and an agricultural machine (tractor). Furthermore, moving objects to which the present technology can be applied include, for example, a moving object, such as a drone and a robot, remotely driven (operated) by a user without boarding. Moreover, the present technology can also be applied to a case where data is shared between different types of moving objects.

4. Others

<Configuration Example of Computer>

The above-described series of processing can be executed by hardware or software. In a case where the series of processing is executed by software, a program constituting the software is installed in a computer. The computer here includes, for example, a computer incorporated in dedicated hardware and, for example, a general-purpose personal computer capable of executing various functions by installing various programs.

Figure 17:
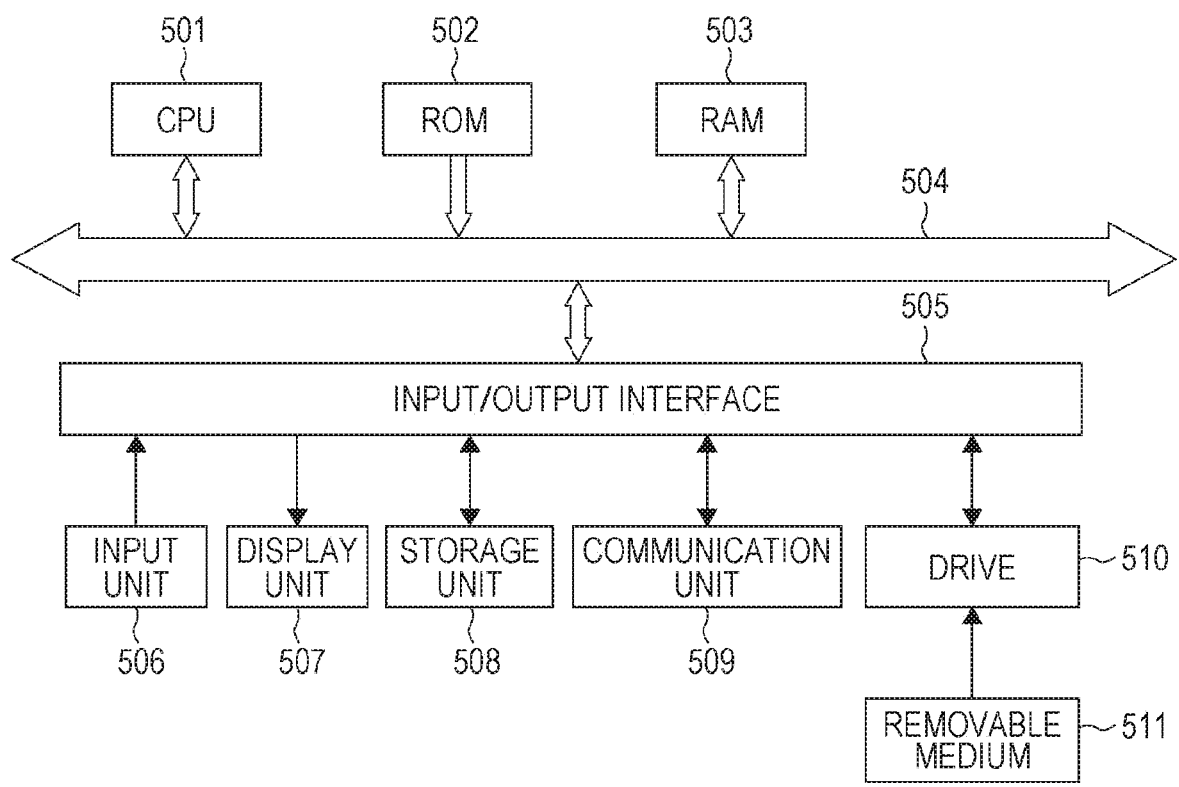
FIG. 17 illustrates a configuration example of a computer.

FIG. 17 is a block diagram illustrating a configuration example of hardware of a computer that executes the above-described series of processing by using a program.

In a computer 500, a central processing unit (CPU) 501, a read only memory (ROM) 502, and a random access memory (RAM) 503 are connected to each other by a bus 504.

An input/output interface 505 is also connected to the bus 504. An input unit 506, an output unit 507, a recording unit 508, a communication unit 509, and a drive 510 are connected to the input/output interface 505.

The input unit 506 includes, for example, an input switch, a button, a microphone, and an imaging element. The output unit 507 includes, for example, a display, and a speaker. The recording unit 508 includes, for example, a hard disk and a nonvolatile memory. The communication unit 509 includes, for example, a network interface. The drive 510 drives a removable recording medium 511 such as a magnetic disk, an optical disk, a magneto-optical disk, and a semiconductor memory.

In the computer 500 configured as described above, the above-described series of processing is performed by the CPU 501 loading, for example, a program recorded in the recording unit 508 in the RAM 503 via the input/output interface 505 and the bus 504 and executing the program.

A program to be executed by the computer 500 (CPU 501) can be provided by, for example, being recorded in the removable recording medium 511 serving as a package medium and the like. Furthermore, the program can be provided via a wired or wireless transmission medium such as a local area network, the Internet, and digital satellite broadcasting.

In the computer 500, the program can be installed in the recording unit 508 via the input/output interface 505 by mounting the removable recording medium 511 in the drive 510. Furthermore, the program can be received by the communication unit 509 via a wired or wireless transmission medium, and installed in the recording unit 508. In addition, the program can be installed in the ROM 502 and the recording unit 508 in advance.

Note that a program executed by a computer may be chronologically processed along the order described in the specification, or may be processed in parallel or at necessary timing, for example, the timing when calling is performed.

Furthermore, in the specification, a system means a collection of a plurality of components (e.g., apparatuses and modules (parts)), and it does not matter whether or not all the components are in the same housing. Consequently, both of a plurality of apparatuses accommodated in different housings and connected via a network, and one apparatus having a plurality of modules accommodated in one housing are systems.

Moreover, embodiments of the present technology are not limited to the above-described embodiments, and various modifications are possible without departing from the spirit of the present technology.

For example, the present technology can have a configuration of cloud computing in which a plurality of apparatuses shares one function via a network and performs processing together.

Furthermore, in addition to being executed by one apparatus, each step described in the above-described flowchart can be shared and executed by a plurality of apparatuses.

Moreover, in a case where one step includes a plurality of pieces of processing, the plurality of pieces of processing included in that one step can be shared and executed by a plurality of apparatuses in addition to being executed by one apparatus.

<Examples of Combination of Configuration>

The present technology can also have the configuration as follows.

(1)

An information processing apparatus including:

a data selection unit that selects shared data to be shared between a first moving object and a second moving object on the basis of at least one of a distance between moving objects or a situation of the first moving object, the distance between moving objects being a distance between the first and second moving objects; and a data acquisition unit that acquires the shared data from the second moving object.

(2)

The information processing apparatus according to (1), in which, in a case where the second moving object is moving in front of the first moving object in a same direction as the first moving object, the data selection unit selects, as the shared data, at least one of position information regarding the second moving object, position information regarding a moving object around the second moving object, information regarding the second moving object, information regarding a driver of the second moving object, information regarding a surrounding of the second moving object, or sensor data that has been acquired by the second moving object.

(3)

The information processing apparatus according to (1) or (2), in which, in a case where the second moving object is moving in a direction opposite to an advancing direction of the first moving object, the data selection unit selects, as the shared data, data regarding a place which the first moving object is to pass through and the second moving object has passed through.

(4)

The information processing apparatus according to any one of (1) to (3), in which, in a case where the first and second moving objects are traveling in parallel, the data selection unit selects, as the shared data, at least one of environmental information regarding a course in which the second moving object is traveling or information regarding a place in a blind angle of the first moving object caused by the second moving object.

(5)

The information processing apparatus according to any one of (1) to (4), in which, in a case where the distance between moving objects is within a predetermined range, the data selection unit selects, as the shared data, data used for estimating a self-position of the first moving object.

(6)

The information processing apparatus according to any one of (1) to (5), in which, in a case where the distance between moving objects is equal to or greater than a predetermined distance, the data selection unit selects, as the shared data, information regarding a situation around the second moving object.

(7)

The information processing apparatus according to any one of (1) to (6), in which the data selection unit selects the shared data on the basis of a time zone during movement.

(8)

The information processing apparatus according to any one of (1) to (7), in which the data selection unit determines whether or not to select, as the shared data, information regarding an obstacle around the second moving object on the basis of a result of comparing a stopping distance of the first moving object with the distance between moving objects.

(9)

The information processing apparatus according to any one of (1) to (8), in which the first and second moving objects are vehicles advancing in a same advancing direction, and in a case where a road in the advancing direction of the first moving object has two or more lanes, the data selection unit determines whether or not to select, as the shared data, information regarding an obstacle around the second moving object on the basis of a result of comparing a distance in which the first moving object can change lanes with the distance between moving objects.

(10)

The information processing apparatus according to any one of (1) to (9), in which the first and second moving objects are vehicles, and the data selection unit selects the shared data on the basis of a state of a road in which the first moving object is traveling.

(11)

The information processing apparatus according to any one of (1) to (10), in which the first and second moving objects are vehicles, and the data selection unit selects the shared data on the basis of whether or not a traffic jam has occurred around the first moving object.

(12)

The information processing apparatus according to any one of (1) to (11), in which the data selection unit selects the shared data from data corresponding to quasi-dynamic information and dynamic information of a dynamic map.

(13)

The information processing apparatus according to any one of (1) to (12), further including a communication control unit that performs control so that the first and second moving objects directly communicate with each other.

(14)

The information processing apparatus according to any one of (1) to (12), further including a communication control unit that performs control so that the first and second moving objects communicate with each other via at least one of another moving object or a facility.

(15)

The information processing apparatus according to any one of (1) to (12), further including a communication control unit that performs control so that the first and second moving objects communicate with each other via a network.

(16)

The information processing apparatus according to any one of (1) to (15), provided in the first moving object.

(17)

An information processing method including an information processing apparatus:

selecting shared data to be shared between a first moving object and a second moving object on the basis of at least one of a distance between moving objects or a situation of the first moving object, the distance between moving objects being a distance between the first and second moving objects; and acquiring the shared data from the second moving object.

(18)

A program for causing a computer to perform processing of:

selecting shared data to be shared between a first moving object and a second moving object on the basis of at least one of a distance between moving objects or a situation of the first moving object, the distance between moving objects being a distance between the first and second moving objects; and acquiring the shared data from the second moving object.

(19)

A moving object including:

a data selection unit that selects shared data to be shared with another moving object on the basis of at least one of a distance between moving objects or a situation of the moving object itself, the distance between moving objects being a distance to the other moving object; and a data acquisition unit that acquires the shared data from the other moving object.

(20)

An information processing apparatus including:

a data selection unit that selects shared data to be shared between a first moving object and a second moving object on the basis of at least one of a distance between moving objects or a situation of the first moving object, the distance between moving objects being a distance between the first and second moving objects; and a data provision unit that provides the shared data to the first moving object.

Note that, the effects described in the specification are merely illustrations, and are not limited. Other effects may be exhibited.

REFERENCE SIGNS LIST

10, 10A to 10C Vehicle
100 Vehicle control system
102 Data acquisition unit
103 Communication unit
112 Automatic driving control unit
131 Detection unit
132 Self-position estimation unit
133 Situation analysis unit
141 Vehicle exterior information detection unit
142 Vehicle interior information detection unit
143 Vehicle state detection unit
153 Situation recognition unit
201 Vehicle-to-vehicle-distance detection unit
202 Situation recognition unit
203 Communication control unit
204 Data selection unit
205 Data acquisition unit
206 Data provision unit
301 Traffic light
311 Network
312 Server

The invention claimed is:

1. An information processing apparatus, comprising:
  a data selection unit configured to select obstacle information as shared data shared between a first moving object and a second moving object, wherein
    the selection of the obstacle information as the shared data is based on
      a distance between the first moving object and the second moving object that is greater than a stopping distance of the first moving object, and
      a situation of the first moving object, and
    the obstacle is information is related to an obstacle around the second moving object; and
  a data acquisition unit configured to acquire the shared data from the second moving object.

2. The information processing apparatus according to claim 1, wherein, in a case where the second moving object is moving in front of the first moving object in a same direction as the first moving object, the shared data is at least one of position information related to the second moving object, position information related to a specific moving object around the second moving object, information related to the second moving object, information related to a driver of the second moving object, information related to a surrounding of the second moving object, or sensor data that is acquired by the second moving object.

3. The information processing apparatus according to claim 1, wherein, in a case where the second moving object is moving in a direction opposite to an advancing direction of the first moving object, the shared data is data related to a place which the first moving object is to pass through and the second moving object has passed through.

4. The information processing apparatus according to claim 1, wherein, in a case where the first moving object and the second moving object travel in parallel, the shared data is at least one of environmental information related to a course in which the second moving object is traveling or information related to a place in a blind angle of the first moving object caused by the second moving object.

5. The information processing apparatus according to claim 1, wherein, in a case where the distance between the first moving object and the second moving object is within a specific range, the shared data is data used for estimation of a position of the first moving object.

6. The information processing apparatus according to claim 1, wherein, in a case where the distance between the first moving object and the second moving object is one of equal to or greater than a specific distance, the shared data is information related to a situation around the second moving object.

7. The information processing apparatus according to claim 1, wherein the data selection unit is further configured to select the shared data based on a time zone during movement of the first moving object.

8. The information processing apparatus according to claim 1, wherein the data selection unit is further configured to determine, in a case where the first moving object and the second moving object are vehicles that advance in a same advancing direction, and a road in an advancing direction of the first moving object has at least two lanes, whether to select, as the shared data, the obstacle information based on a result of a comparison between a distance in which the first moving object changes lanes and the distance between the first moving object and the second moving object.

9. The information processing apparatus according to claim 1, wherein
the first moving object and the second moving object are vehicles, and
the data selection unit is further configured to select the shared data based on a state of a road in which the first moving object is traveling.

10. The information processing apparatus according to claim 1, wherein
the first moving object and the second moving object are vehicles, and
the data selection unit is further configured to select the shared data based on occurrence of traffic jam around the first moving object.

11. The information processing apparatus according to claim 1, wherein the data selection unit is further configured to select the shared data from data corresponding to quasi-dynamic information and dynamic information of a dynamic map.

12. The information processing apparatus according to claim 1, further comprising a communication control unit configured to control the first moving object and the second moving object to directly communicate with each other.

13. The information processing apparatus according to claim 1, further comprising a communication control unit configured to control the first moving object and the second moving object to communicate with each other via at least one of a third moving object or a facility.

14. The information processing apparatus according to claim 1, further comprising a communication control unit configured to control the first moving object and the second moving object to communicate with each other via a network.

15. The information processing apparatus according to claim 1, wherein the information processing apparatus is in the first moving object.

16. An information processing method, comprising:
selecting obstacle information as shared data shared between a first moving object and a second moving object, wherein
the selection of the obstacle information as the shared data is based on
a distance between the first moving object and the second moving object that is greater than a stopping distance of the first moving object, and
a situation of the first moving object, and
the obstacle information is related to an obstacle around the second moving object; and
acquiring the shared data from the second moving object.

17. A non-transitory computer-readable medium having stored thereon computer-executable instructions, that when executed by a processor, cause the processor to execute operations, the operations comprising:
selecting obstacle information as shared data shared between a first moving object and a second moving object, wherein
the selection of the obstacle information as the shared data is based on
a distance between the first moving object and the second moving object that is greater than a stopping distance of the first moving object, and
a situation of the first moving object, and
the obstacle information is related to an obstacle around the second moving object; and
acquiring the shared data from the second moving object.

18. A first moving object, comprising:
a data selection unit configured to:
select obstacle information as shared data shared with a second moving object, wherein
the selection of the obstacle information as the shared data is based on
a distance between the first moving object and the second moving object that is greater than a stopping distance of the first moving object, and
a situation of the first moving object, and
the obstacle information is related to an obstacle around the second moving object; and
a data acquisition unit configured to acquire the shared data from the second moving object.

19. An information processing apparatus, comprising:
a data selection unit configured to select obstacle information as shared data shared between a first moving object and a second moving object, wherein
the selection of the obstacle information as the shared data is based on
a distance between the first moving object and the second moving object that is greater than a stopping distance of the first moving object, and
a situation of the first moving object, and
the obstacle information is related to an obstacle around the second moving object; and
a data provision unit configured to provide the shared data to the first moving object.

20. An information processing apparatus, comprising:
a data selection unit configured to select, in a case where a first moving object and a second moving object are vehicles that advance in a same advancing direction, and a road in an advancing direction of the first moving object has at least two lanes, obstacle information as shared data shared between the first moving object and the second moving object, wherein
the obstacle information is related to an obstacle around the second moving object, and
the selection of the obstacle information as the shared data is based on
a distance between the first moving object and the second moving object that is greater than a distance in which the first moving object changes lanes, and
a situation of the first moving object; and
a data acquisition unit configured to acquire the shared data from the second moving object.

* * * * *